US012294725B2

(12) United States Patent
Galpin et al.

(10) Patent No.: US 12,294,725 B2
(45) Date of Patent: May 6, 2025

(54) METHOD AND APPARATUS USING HOMOGENEOUS SYNTAX WITH CODING TOOLS

(71) Applicant: INTERDIGITAL CE PATENT HOLDINGS, SAS, Paris (FR)

(72) Inventors: Franck Galpin, Thorigne-Fouillard (FR); Philippe Bordes, Laille (FR); Gagan Rath, Rennes (FR); Edouard Francois, Bourg des Comptes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 108 days.

(21) Appl. No.: 17/760,904

(22) PCT Filed: Sep. 18, 2020

(86) PCT No.: PCT/EP2020/076071
§ 371 (c)(1),
(2) Date: Mar. 16, 2022

(87) PCT Pub. No.: WO2021/058383
PCT Pub. Date: Apr. 1, 2021

(65) Prior Publication Data
US 2022/0385922 A1  Dec. 1, 2022

(30) Foreign Application Priority Data

Sep. 24, 2019 (EP) ..................................... 19306178
Sep. 27, 2019 (EP) ..................................... 19290093

(51) Int. Cl.
*H04N 19/167* (2014.01)
*H04N 19/105* (2014.01)
(Continued)

(52) U.S. Cl.
CPC ......... *H04N 19/167* (2014.11); *H04N 19/105* (2014.11); *H04N 19/157* (2014.11);
(Continued)

(58) Field of Classification Search
CPC .. H04N 19/167; H04N 19/105; H04N 19/157; H04N 19/159; H04N 19/176; H04N 19/593; H04N 19/70
(Continued)

(56) References Cited

U.S. PATENT DOCUMENTS 9,918,091 B2\*  3/2018  Wang ................... H04N 19/119
10,419,754 B1    9/2019  Zhao et al.
(Continued)

FOREIGN PATENT DOCUMENTS

EP          3734972       11/2020

OTHER PUBLICATIONS

Chen J et al—Algorithm description for Versatile Video Coding and Test Model 6 (VTM 6), 127. MPEG Meeting; Jul. 8, 2019-Jul. 12, 2019; Gothenburg; (Motion Picture Expert Group or ISO/IEC JTC1/SC29/WG11 ) (Year: 2019).\*
(Continued)

*Primary Examiner* — Christopher S Kelley
*Assistant Examiner* — Asmamaw G Tarko
(74) *Attorney, Agent, or Firm* — Condo Roccia Koptiw LLP

(57) ABSTRACT

Flexible methods to use a combination of coding modes while keeping good performance tradeoff are implemented with embodiments that determine coding mode information. In one embodiment, determination is made of activation of a first coding mode, and upon determination of whether a second coding mode is used, coding or decoding using the determined modes occurs. Other embodiments enable use of multiple reference lines, intra sub-block partitioning, matrix intra prediction, and low frequency non-separable transforms.

24 Claims, 22 Drawing Sheets

(51) Int. Cl.
*H04N 19/157* (2014.01)
*H04N 19/159* (2014.01)
*H04N 19/176* (2014.01)
*H04N 19/593* (2014.01)
*H04N 19/70* (2014.01)

(52) U.S. Cl.
CPC ......... *H04N 19/159* (2014.11); *H04N 19/176* (2014.11); *H04N 19/593* (2014.11); *H04N 19/70* (2014.11)

(58) Field of Classification Search
USPC .................................................. 375/240.02
See application file for complete search history.

(56) References Cited

U.S. PATENT DOCUMENTS

| | | | | |
|---|---|---|---|---|
| 10,715,833 | B2* | 7/2020 | Zheng | H04N 19/70 |
| 2015/0103886 | A1* | 4/2015 | He | H04N 19/70 |
| | | | | 375/240.02 |
| 2016/0057441 | A1* | 2/2016 | Skupin | H04N 19/105 |
| | | | | 375/240.25 |
| 2021/0250590 | A1* | 8/2021 | Gao | H04N 19/96 |
| 2021/0258598 | A1* | 8/2021 | Hendry | H04N 19/70 |
| 2021/0281835 | A1* | 9/2021 | Filippov | H04N 19/593 |
| 2022/0086493 | A1* | 3/2022 | Francois | H04N 19/176 |
| 2022/0150479 | A1* | 5/2022 | Rosewarne | H04N 19/18 |
| 2022/0159294 | A1* | 5/2022 | Yoo | H04N 19/70 |
| 2022/0224885 | A1* | 7/2022 | Kim | H04N 19/159 |

OTHER PUBLICATIONS

Chen et al., Algorithm Description for Versatile Video Coding and Test Model 6 (VTM 6); Joint Video Experts Team (JVET) of ITU-T SG 16 WP 3 and ISO/IEC JTC 1/SC 29/WG 11, 15th Meeting: Gothenburg, Sweden, Jul. 3-12, 2019 Document: JVET-O2002-v2.

Aklouf et al., Low Complexity Versatile Video Coding (VVC) for Low Bitrate Applications, 2019 8th European Workshop in Visual Information Processing (EUVIP), IEEE, Oct. 28, 2019 pp. 22-27.

Bross, et al., Versatile Video Coding (Draft 6), Joint Video Experts Team (JVET) of ITU-T SG WP 3 and ISO/IEC JTC 1/SC 29/WG 11, 15th Meeting, Gothenburg, SE, Jul. 3-12, 2019, Document: JVET-O2001-vE.

* cited by examiner

METHOD AND APPARATUS USING HOMOGENEOUS SYNTAX WITH CODING TOOLS

CROSS REFERENCE TO RELATED APPLICATIONS

This application is the national stage entry under 35 U.S.C. § 371 of International Application PCT/EP202010076071, filed Sep. 18, 2020, which was published in accordance with PCT Article 21(2) on Apr. 1, 2021, in English, and which claims the benefit of European Patent Application No. 19306178.5, filed Sep. 24, 2019, and European Patent Application No. 19290093.4, filed Sep. 27, 2019, the disclosures of each of which are incorporated by reference herein in their entireties.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for using homogenous coding syntax with particular coding tools, as in the WC (Versatile Video Coding or H.266) standard.

According to a first aspect, there is provided a method. The method comprises steps for determining whether to activate a first coding tool for encoding a portion of a video image; determining whether a second coding tool is activated for encoding the portion of the video image and conditions for said activation; and, conditionally performing at least one of said coding tools.

According to a second aspect, there is provided a method. The method comprises steps for determining whether a first decoding tool is activated from a video bitstream; determining whether a second decoding tool is activated and conditions for said activation; and, conditionally performing at least one of said decoding tools.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The context of the described embodiments is in the field of video compression. and addresses the particular issue with the coding mode combinatory in a codec. More specifically, in VVC, some combinations of modes are normatively removed from the specification because they do not offer a good performance/complexity tradeoff at the encoder. In other words, restrictions are applied on the usage of some modes, that cannot be used depending on the context.

The described embodiments describe a flexible method to use a combination of these modes while keeping good performance tradeoff in the general case.

In the following, several acronyms referring to coding modes discussed in the present aspects are used. The underlying process associated with each mode is not especially relevant for the present explanation, but rather relates to the restrictions applying to activate those modes. Therefore, only a short explanation of those modes is provided below. More detail can be found in VVC documents.

Multiple Reference Line (MRL) Intra Prediction

Figure 1:
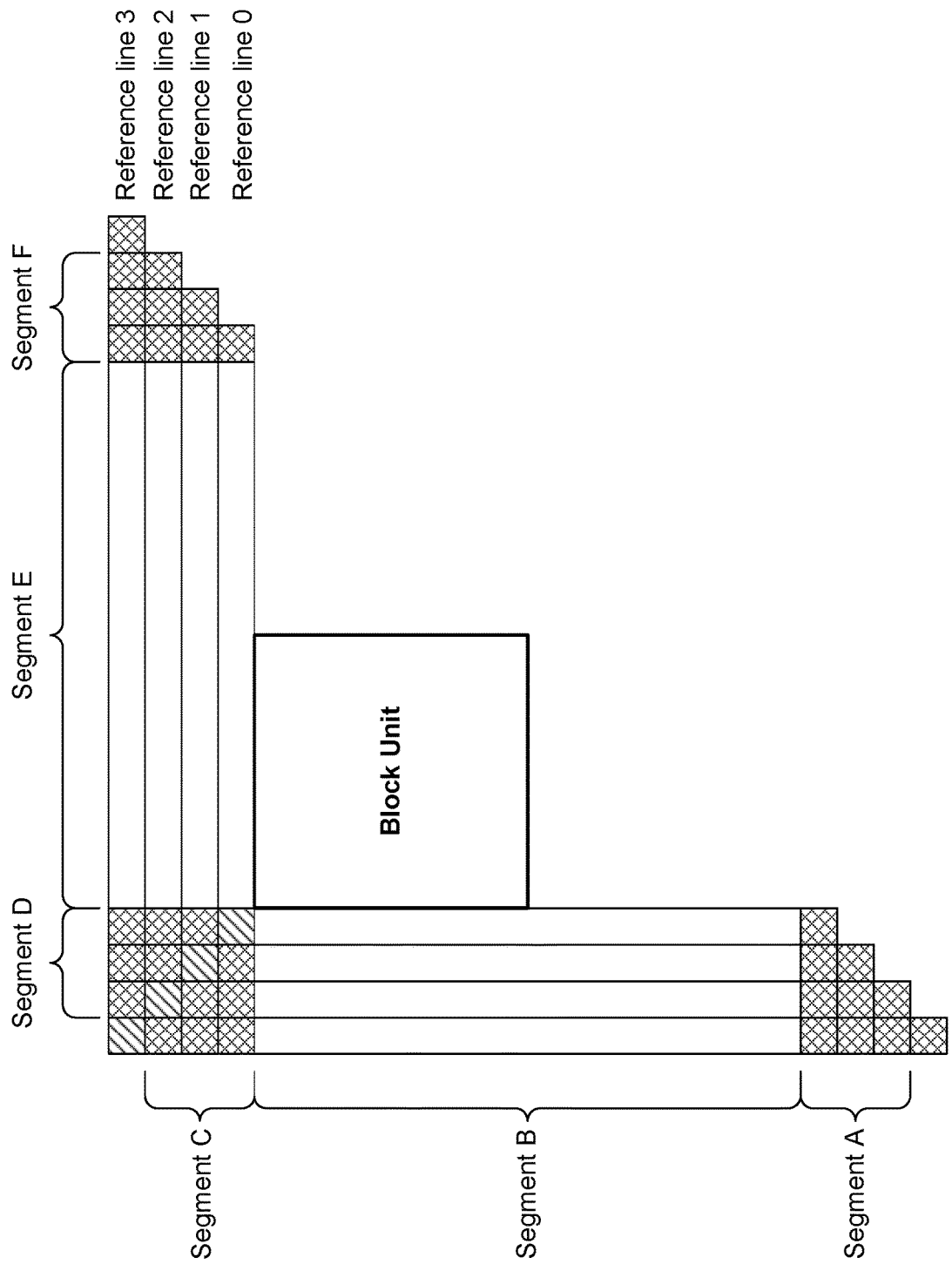
FIG. 1 illustrates an example of four reference lines neighboring to a prediction block.

Intra prediction of a block is based on already reconstructed neighboring samples of the block. These samples are named reference samples. In normal intra prediction, only the nearest line/column of the coded block is used as reference samples. In Multiple reference line (MRL) intra prediction, more reference lines for intra prediction are used. In FIG. 1, an example of 4 reference lines is depicted, where the samples of segments A and F are not fetched from reconstructed neighboring samples but padded with the closest samples from Segment B and E, respectively.

Interaction MRL-MPM

The index of selected reference line (mrl_idx) is signaled and used to generate an intra predictor. MRL only applies to one of the MPM (Most Probably Mode) modes, and not to any of the remaining modes. Planar and DC modes are excluded from intra prediction modes when MRL is used. This is one case of mode usage restriction addressed in the present description.

Intra Sub-Partitions (ISP)

Figure 2:
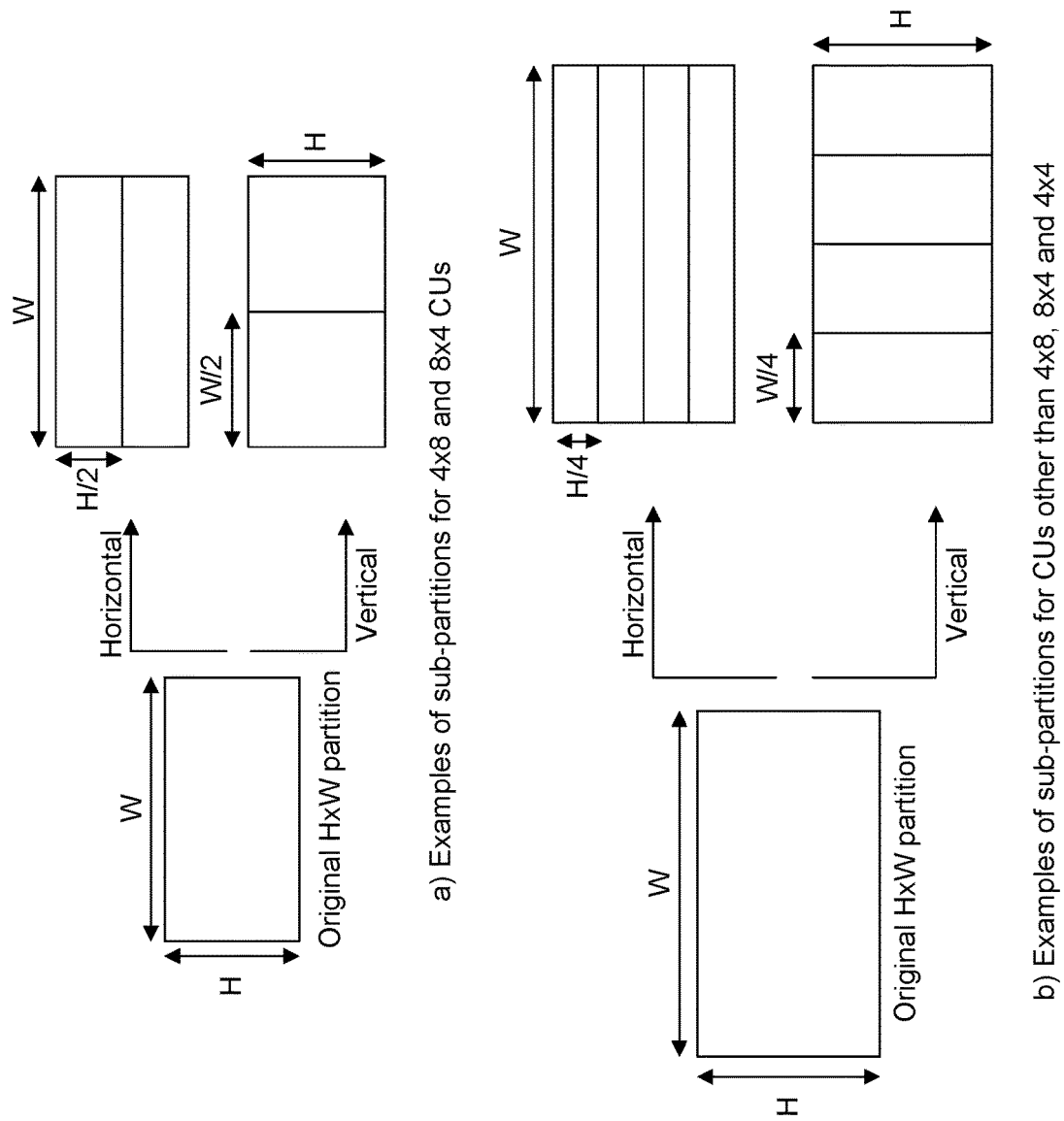
FIG. 2 illustrates a sub-partition depending on the block size.

The Intra Sub-Partitions (ISP) tool divides luma intra-predicted blocks vertically or horizontally into 2 or 4 sub-partitions. FIG. 2 shows examples of the two possibilities. All sub-partitions fulfill the condition of having at least 16 samples.

In ISP, the reconstructed sample values of each sub-partition are available to generate the prediction of the next sub-partition, and each sub-partition is processed repeatedly. The first sub-partition to be processed is the one containing the top-left sample of the CU. The next sub-partitions are iteratively processed downwards (horizontal split) or rightwards (vertical split). All sub-partitions share the same intra mode.

Interactions ISP with Other Coding Tools

Multiple Reference Line (MRL): if a block has an MRL index other than 0, then the ISP coding mode will be inferred to be 0 and therefore ISP mode information will not be sent to the decoder.

MPM usage: the MPM flag will be inferred to be one in a block coded by ISP mode, and the MPM list is modified to exclude the DC mode and to prioritize horizontal intra modes for the ISP horizontal split and vertical intra modes for the vertical one.

Transform size restriction: all ISP transforms with a length larger than 16 points uses the DCT-II.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required.

Matrix Weighted Intra Prediction (MIP)

Figure 3:
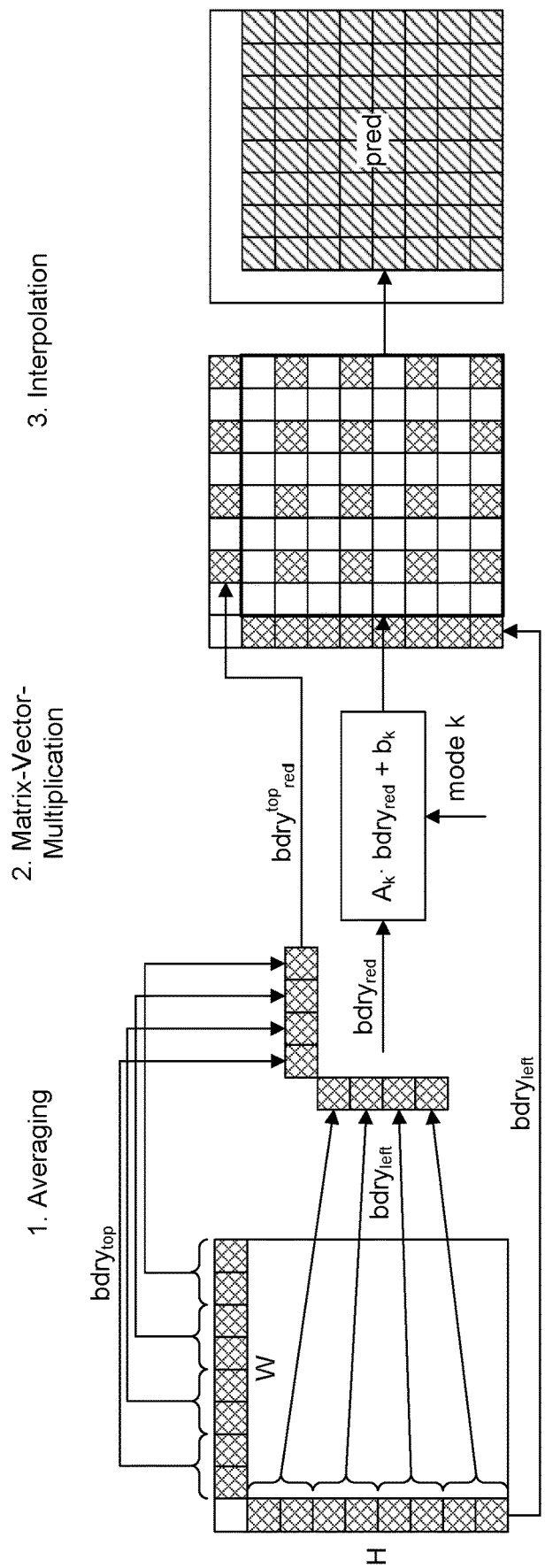
FIG. 3 illustrates Matrix weighted intra prediction process.

In Matrix weighted intra prediction (MIP), the prediction of the samples of a rectangular block of width W and height H, takes one line of H reconstructed neighbouring boundary samples left of the block and one line of W reconstructed neighbouring boundary samples above the block as input. The generation of the prediction signal is based on the following three steps, which are averaging of the reference samples, matrix vector multiplication of the averaged reference samples, and linear interpolation as shown in FIG. 3. The averaging corresponds to a filtering and downsampling of the reference samples. This results on values that are set in a 1D vector. This vector is multiplied by a matrix, selected by an index coded in the stream, which results in a sub-sampled version of the prediction block. A final interpolation is performed to generate the prediction block at full resolution.

For each Coding Unit (CU) in intra mode, a flag indicating if an MIP mode is to be applied on the corresponding Prediction Unit (PU) or not is sent. If an MIP mode is to be applied, the MIP modes are directly coded.

The number of supported MIP modes depends on block size.

Interaction MIP-LFNST

LFNST (Low Frequency Non-Separable Transform) is enabled for MIP on large blocks. Here, the LFNST transforms corresponding to the planar mode are used.

Triangle Prediction Mode (TPM)

Figure 4:
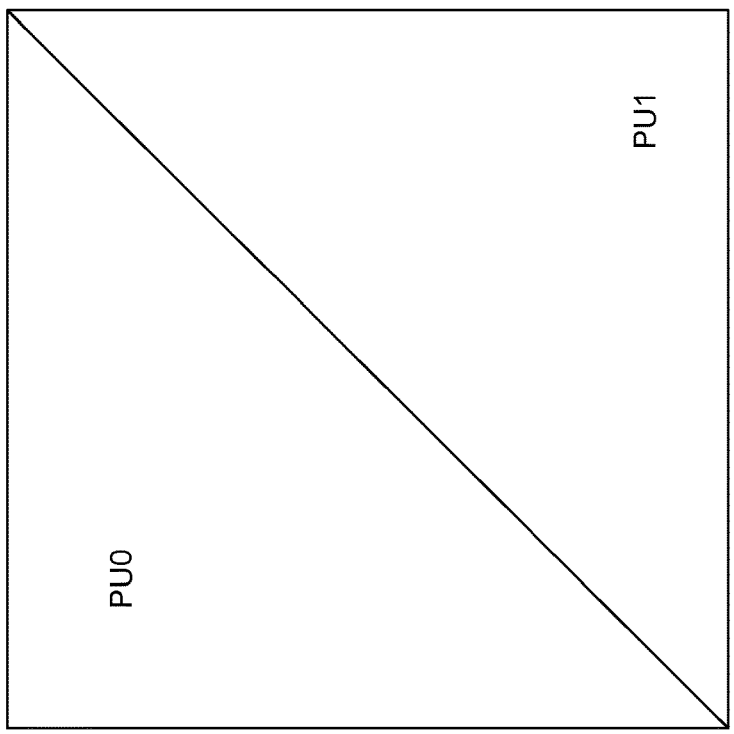
FIG. 4 illustrates Splitting of a CU into two triangular prediction units.
Figure 4:
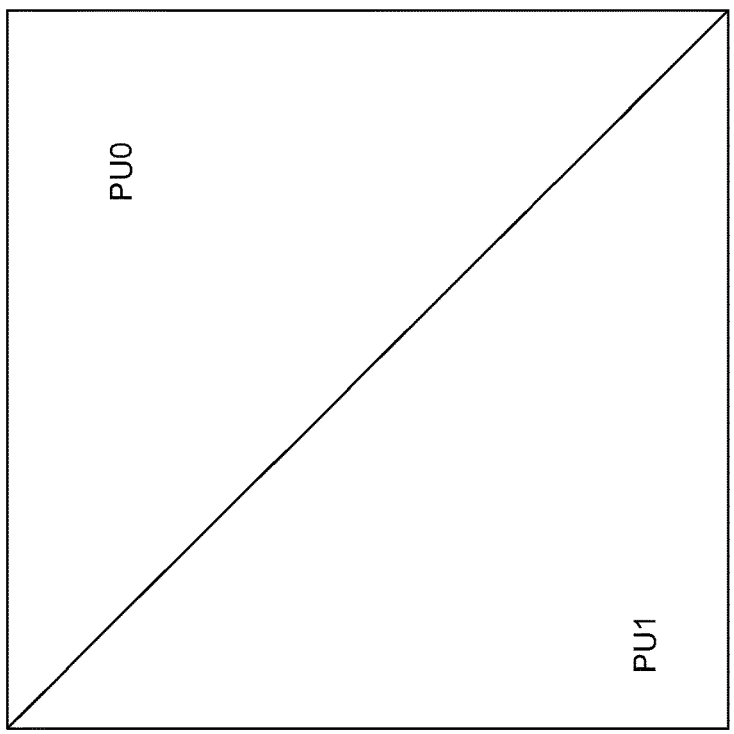

Triangular prediction is an inter prediction that splits the prediction in two triangle partitions. As shown in FIG. 4, a CU is split into two triangular Prediction Units (PUs), either in diagonal or inverse diagonal direction. Each triangular Prediction Unit in the CU is inter-predicted using its own motion vector and reference frame index which are derived from a merge candidate list.

Figure 5:
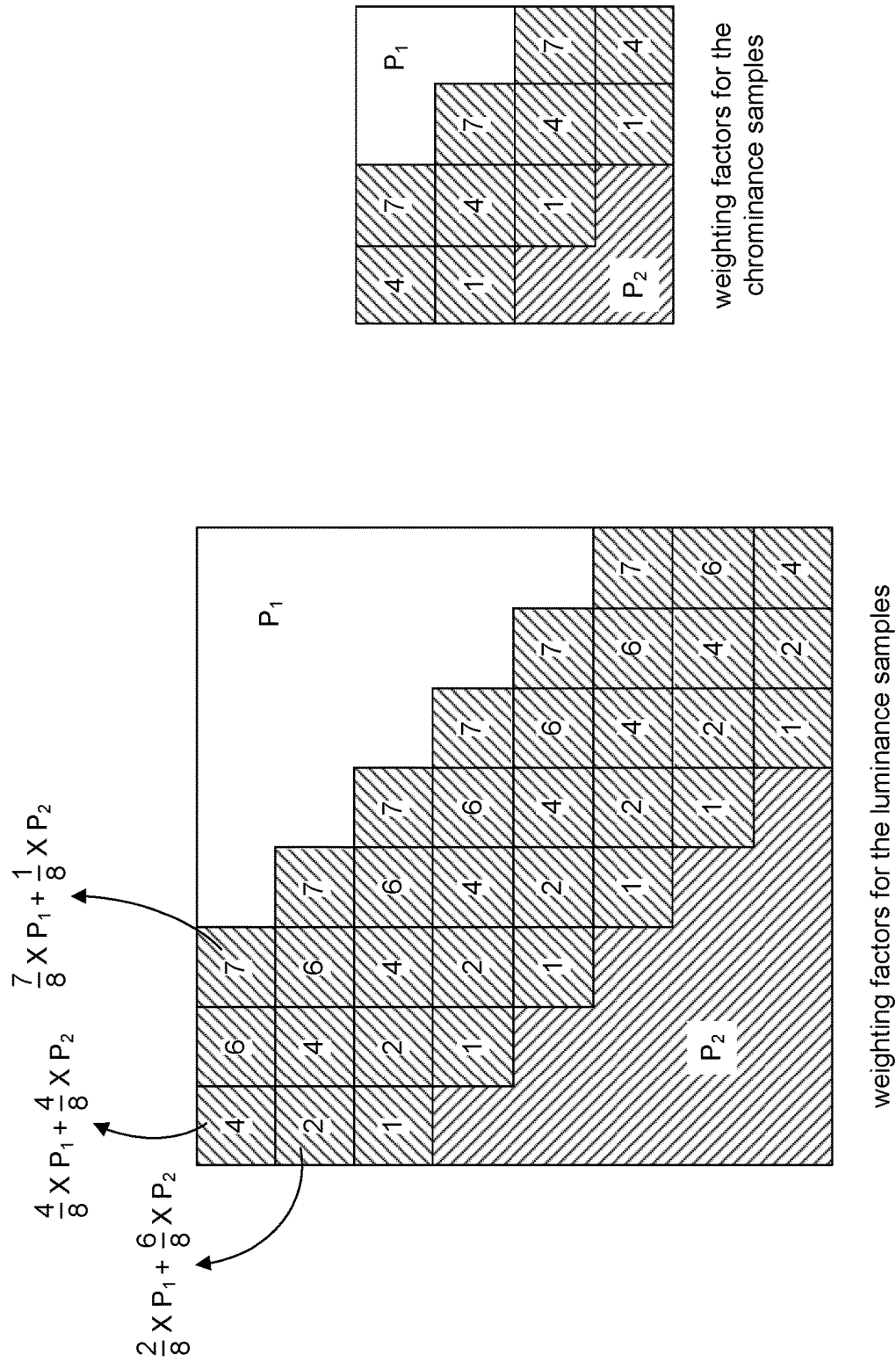
FIG. 5 illustrates Weighting process on the diagonal edge between the two triangular prediction units.

An adaptive weighting process is applied to the prediction samples of diagonal or inverse diagonal edge between the two triangular Prediction Units to derive the final prediction samples values for the whole CU as shown in FIG. 5.

The triangular Prediction Unit mode is only applied to CUs in skip or merge mode. When the triangular Prediction Unit mode is applied to the CU, an index (noted here as triangle_idx) indicating the direction of splitting the CU into two triangular Prediction Units, plus the motion vectors of the two triangular Prediction Units, are signaled.

Interaction TMP-SBT

The triangle partition mode is not used in combination with SBT (Sub-block Transform), that is, when the signalled triangle mode is equal to 1, the cu_sbt_flag (also noted here "sbt") is inferred to be 0 without signalling.

Combined Intra-Inter Prediction (CIIP)

Figure 6:
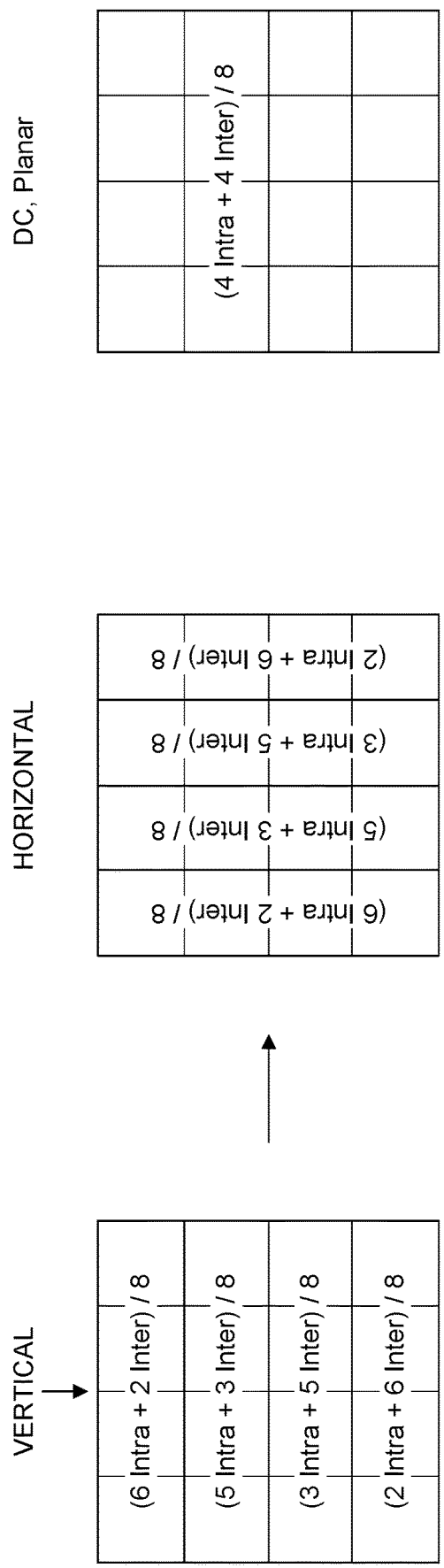
FIG. 6 illustrates Shapes used for the 4 intra prediction in multi hypothesis.

Combined Intra-Inter Prediction general concept is to combine an inter prediction performed in merge mode (merge index is signaled to derive the motion information used for the motion compensated prediction) with an intra prediction mode or with another inter mode (e.g. uni-prediction AMVP, skip or merge). The final prediction is the weighted average of the merge indexed prediction and the prediction generated by the intra prediction mode, where different weights are applied depending on the intra direction and the distance between the current sample and intra reference sample. The FIG. 6 shows the shapes used for the 4 intra prediction used in multi-hypothesis. As illustrated in FIG. 6, the current block is split into 4 equal-area regions.

The weights gradually decrease as the region is far from the intra reference samples. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. When DC or planar mode is selected, or the CU width or height is smaller than 4, equal weights are applied for all samples. In intra prediction in Multi hypothesis CUs, chroma components use Direct mode (same intra direction as luma).

Interaction CIIP-Skip

CIIP cannot be used in case of Skip mode.

Multiple Transform Selection (MTS)

Multiple Transform Selection (MTS) is used for residual coding both inter and intra coded blocks. The set of transforms is used in addition to DCT-II which has been employed in HEVC. The newly introduced transform matrices are DST-VII and DCT-VIII.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma.

MTS Restrictions

The MTS CU level flag is signaled when both the block width and height are smaller than or equal to 32 and when the CBF flag (coded block flag, indicating if the block contains residual data or not) is equal to one.

If MTS CU flag is equal to zero, then DCT2 is applied in both directions. However, if MTS CU flag is equal to one, then two other flags are additionally signaled to indicate the transform type for the horizontal and vertical directions, respectively.

The transform selection for ISP and implicit MTS is used by removing the intra-mode and block-shape dependencies. If current block is ISP mode or if the current block is intra block and both intra and inter explicit MTS is on, then only DST7 is used for both horizontal and vertical transform cores. Low-Frequency Non-Separable Transform (LFNST)

Figure 7:
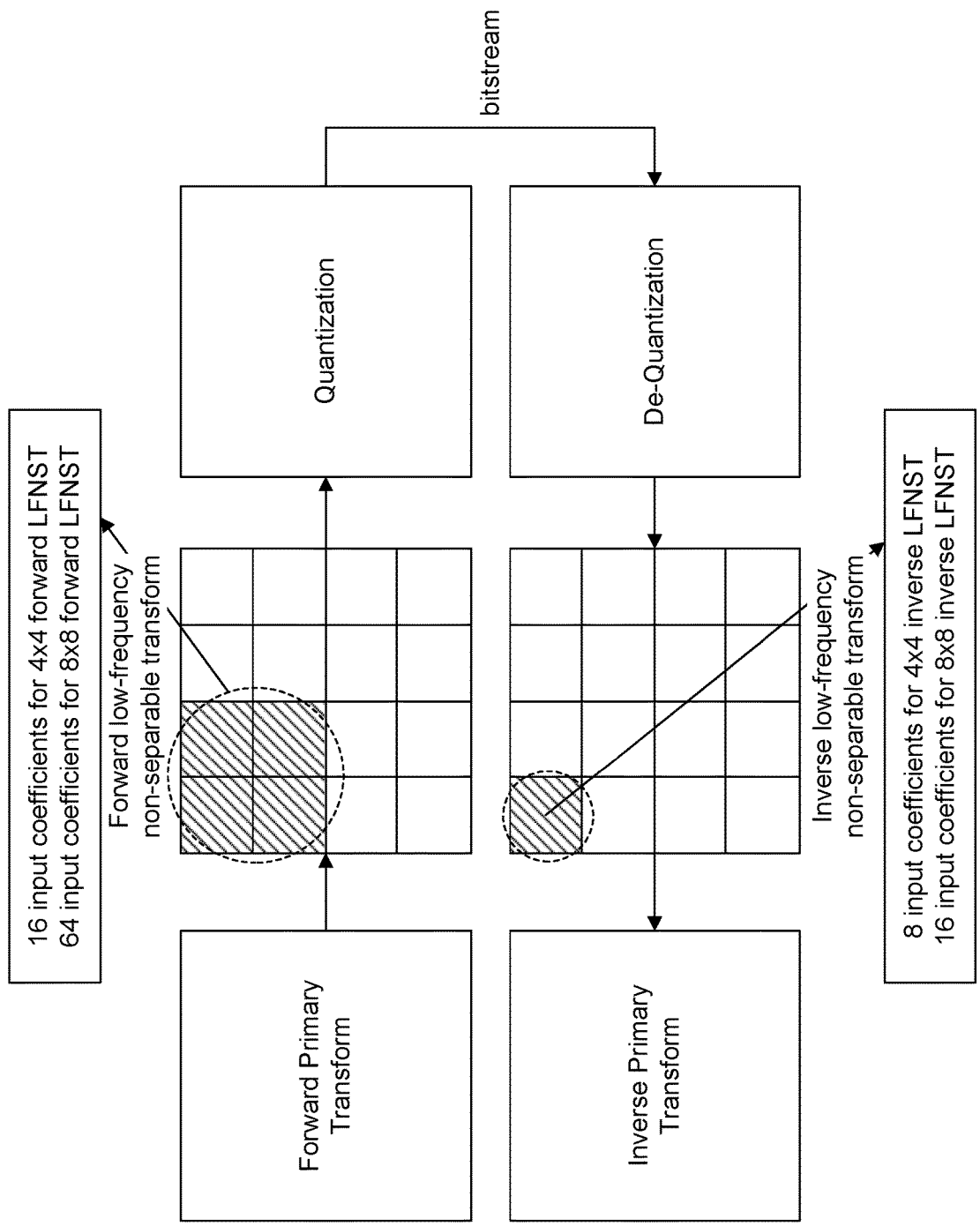
FIG. 7 illustrates Low-Frequency Non-Separable Transform (LFNST) process.

LFNST (low-frequency non-separable transform), also known as reduced secondary transform, is applied between the forward primary transform and quantization (at encoder) and between de-quantization and inverse primary transform (at decoder side) as shown in FIG. 7. In LFNST, 4×4 non-separable transform or 8×8 non-separable transform is applied according to block size. For example, 4×4 LFNST is applied for small blocks (i.e., min (width, height)<8) and 8×8 LFNST is applied for larger blocks (i.e., min (width, height)>4).

Application of a non-separable transform, which is being used in LFNST, is described as follows using input as an example. To apply 4×4 LFNST, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (3\text{-}1)$$

is first represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad (3\text{-}2)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

There are totally 4 transform sets and 2 non-separable transform matrices (kernels) per transform set are used in LFNST. The mapping from the intra prediction mode to the transform set is pre-defined. If one of three Cross-component linear model mode (CCLM) modes is used for the current block, transform set 0 is selected for the current chroma block. For each transform set, the selected non-separable secondary transform candidate is further specified by the explicitly signalled LFNST index. The index is signalled in a bit-stream once per Intra CU after transform coefficients.

Interactions of LNFTS with Other Tools

The LFNST index is context coded but does not depend on intra prediction mode, and only the first bin is context coded. Furthermore, LFNST is applied for intra CU in both intra and inter slices, and for both Luma and Chroma.

When ISP mode is selected, LFNST is disabled. LFNST is also disabled and the index is not signaled when MIP mode is selected.

The maximum size that LFNST is allowed is restricted to 64×64. LFNST is enabled with DCT2 only.

Subblock Transform (SBT)

Subblock transform is introduced for an inter-predicted CU. In this transform mode, only a sub-part of the residual block is coded for the CU. When inter-predicted CU with cbf equal to 1, cu_sbt_flag (also noted "sbt" in the described embodiments) may be signaled to indicate whether the whole residual block or a sub-part of the residual block is coded. In the former case, inter MTS information is further parsed to determine the transform type of the CU. In the latter case, a part of the residual block is coded with inferred adaptive transform and the other part of the residual block is zeroed out.

Figure 8:
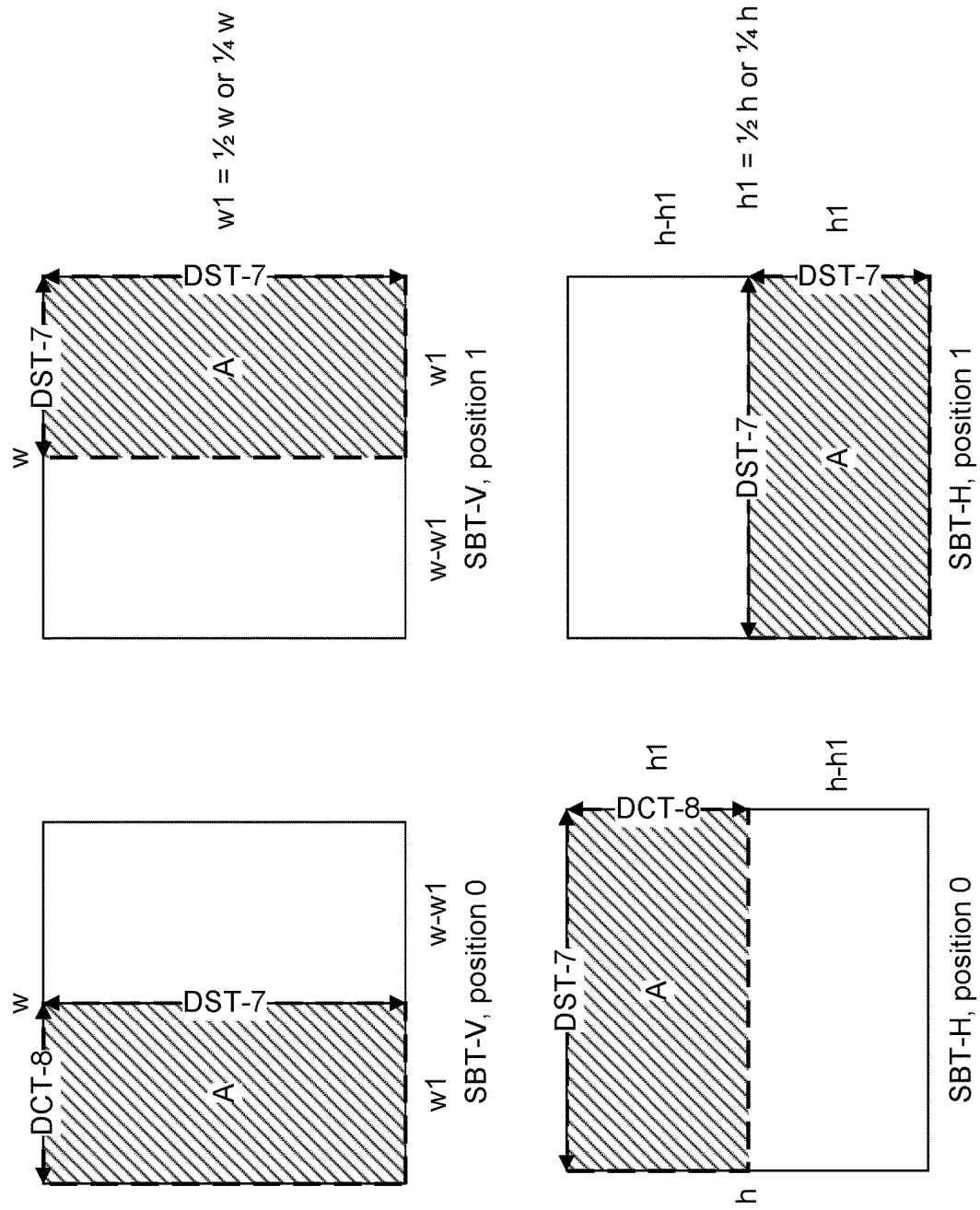
FIG. 8 illustrates SBT position, type and transform type.

When SBT is used for an inter-coded CU, SBT type and SBT position information are signaled in the bitstream. There are two SBT types and two SBT positions, as indicated in FIG. 8. For SBT-V (or SBT-H), the TU width (or height) may equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension is disallowed. There are at most 8 SBT modes for a CU.

Interaction SBT-TMP

The SBT is not applied to the CU coded with combined inter-intra mode or TPM (Triangular Partition mode) mode.

Switchable Filter

The principle of switchable interpolation filter (IF) is to improve the motion compensation prediction by selecting the IF (hpellfldx) to use for each block prediction.

The IFs may differ with smoothing characteristics typically. For example, in Versatile Video Coding proposals, the IF index (hpellfldx) is determined per coding unit (CU) and is derived from the coded "amvr_precision_idx" index indicating the resolution of the coded motion vector difference (MVD): if IMV=HALF_PEL, then IF-idx=1 is selected, else IF-idx=0.

Figure 10:
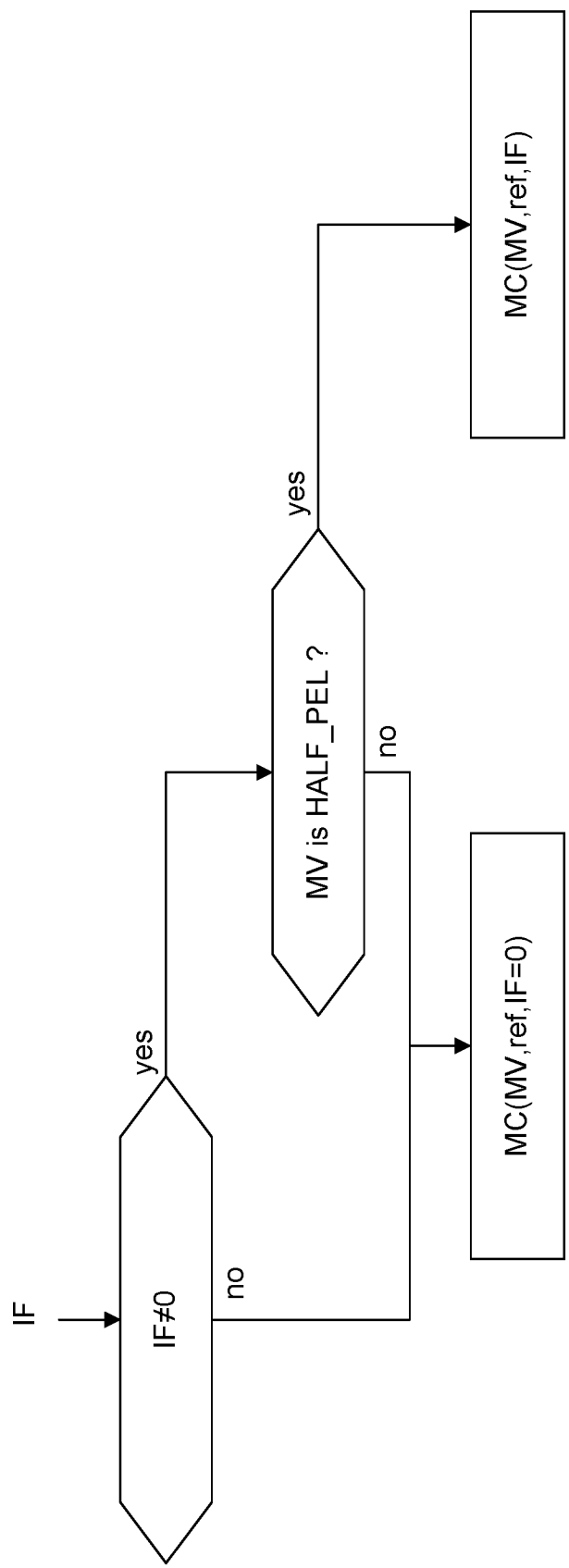
FIG. 10 illustrates a value of "IF-index" and "MV" allows deriving motion compensation filter.

In case of Merge, the IF index is not coded explicitly but derived from merge candidate(s). In VVC, IF-index value can be one among two filters (IF-0 or IF-1}, but IF-1 can be used for HALF_PEL motion vector values only. Then if IF-index is not equal to zero and the MV horizontal (or vertical) component is not HALF_PEL, then IF-0 is used (FIG. 10).

Coding Unit Syntax Tree

Figure 11:
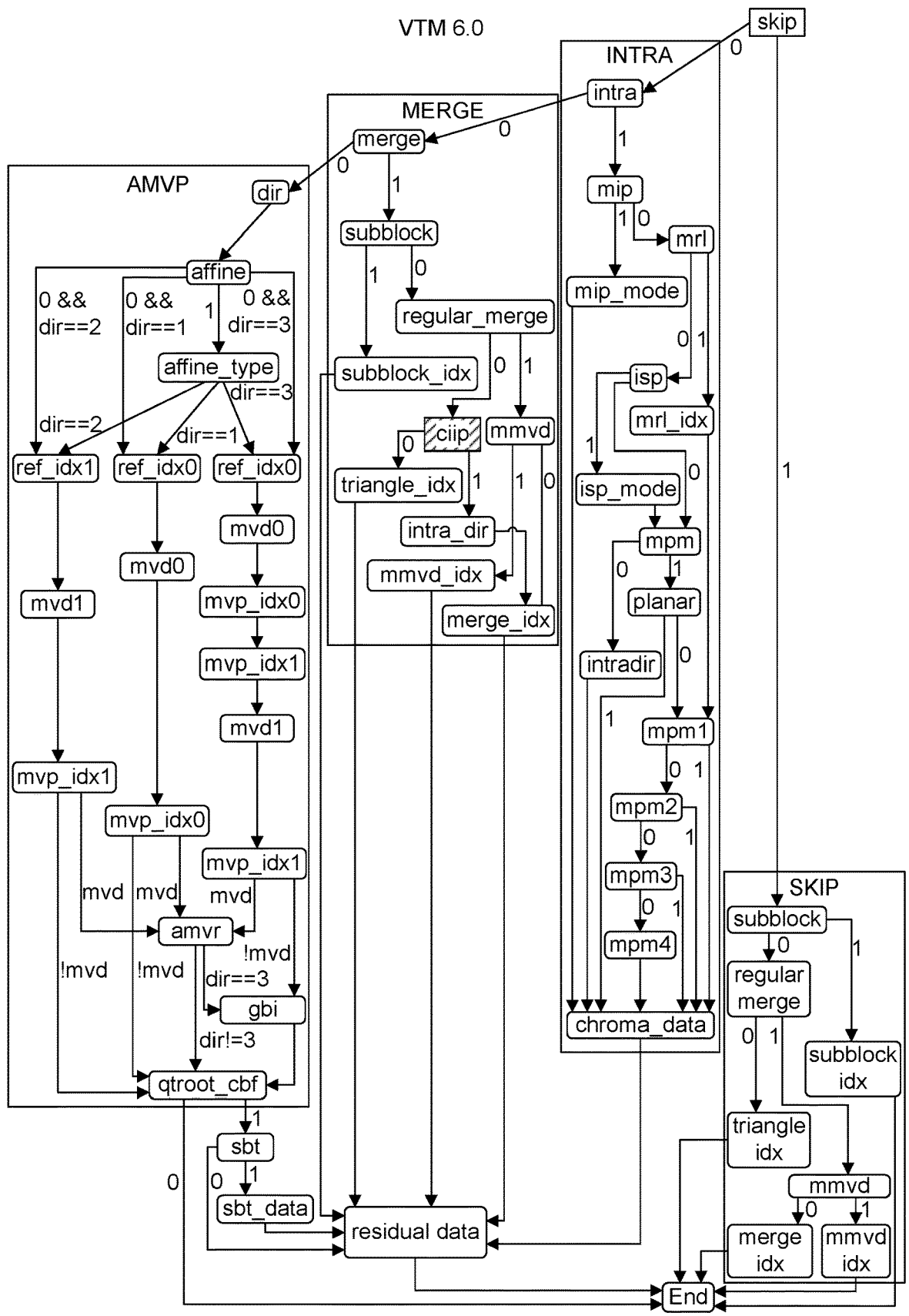
FIG. 11 illustrates coding unit tree syntax.

The syntax tree of a coding unit is shown in FIG. 11. The tree design is based on the value of different parameters controlling coding modes. A short explanation of these parameters in given below.

Three main Boolean parameters are used:

"skip"—Boolean parameter indicating if the block is coded in split mode or not—In skip mode, no residual prediction signal is coded "merge"—Boolean parameter indicating if the block is coded in inter prediction with merge mode or not—in case of merge mode, motion vectors are derived from candidate motion vector lists, and no motion vector difference is coded "intra"—Boolean parameter indicating if the block is coded in intra prediction mode or not Depending on the value of these parameters, four coding options are possible for the coded block, corresponding to the four main branches of the decision tree.

Option1—Inter Prediction with Skip Mode

When skip is enabled, the skip mode is used. Skip mode is an inter prediction mode where no residual prediction signal, and no motion vector prediction difference (except in mmvd mode where a correction can be added), are coded. Motion data (motion vectors, reference indexes) are predicted from lists of motion vector candidates, the motion data predictor being identified by an index (noted here merge idx).

The following parameters may be used.

"subblock"—Boolean parameter indicating if the motion vectors of the block are derived per sub-block (typically 4×4 blocks) or not "regular merge"—Boolean parameter indicating if the motion vector derivation will be based on the merge mode or not "subblock idx"—parameter corresponding to the index of the subblock candidate (either ATMVP of affine candidate)

"triangle idx"—parameter corresponding to the type of triangular prediction mode and index of the candidate "mmvd"—Boolean parameter indicating if the Merge mode with Motion Vector Difference (MMVD) is selected or not "merge idx"—parameter corresponding to the index of motion vector prediction in the motion vector candidate list of the merge mode "mmvd idx"—parameter corresponding to the index of MMVD motion vector prediction Option2—Intra Prediction Case When skip is disabled, and the "intra" parameter is on, intra prediction is activated. The following parameters may be used when intra prediction applies:

"mip"—Boolean parameter indicating if the block is coded in the Matrix weighted intra prediction (MIP) mode or not "mrl"—Boolean parameter indicating if the block is coded in the Multiple reference line (MRL) intra prediction mode or not "isp"—Boolean parameter indicating if the block is coded in the Intra Sub-Partitions (ISP) prediction mode or not "mip_mode"—parameter giving the MIP intra prediction sub-mode value "mrl_idx"—parameter indicating the line to be used for the intra prediction in case of MRL intra prediction mode "isp_mode"—parameter indicating the type of ISP prediction "mpm, mpm1 to mpm4"—flags related to the Most Probable Mode (MPM) intra mode derivation "planar"—flag indicating if the intra mode is the planar mode or not "intradir"—parameter giving the intra prediction direction Option3—Inter Prediction with Merge Mode When "skip" and "intra" are disabled, and the "merge" parameter is on, inter prediction with merge mode is activated. Merge mode is an inter prediction mode where motion vectors are derived from candidate motion vector lists, and no motion vector difference is coded (except in mmvd mode where a correction can be added). An index is coded to indicate the candidate motion vector used as predictor (denoted here merge idx).

The following parameters may be used:

The same parameters used in the skip case are used: "subblock", "regular merge", "subblock idx", "triangle idx", "mmvd", "merge idx", "mmvd idx"

In addition, one parameter is restricted to the merge case:

"cip"—Boolean parameter indicating if the combined inter/intra prediction (CIIP) mode is selected or not Option4—Inter Prediction with AMVP Mode When "skip", "intra" and "merge" are disabled, inter prediction with Advanced Motion Vector Prediction (AMVP) is used. AMVP is the general concept of motion prediction, consisting in performing the prediction of motion vectors based on lists of motion vector candidates. To identify the predictor, an index is signaled (denoted here mvp_idx). In this case, residual prediction data and motion vector differences information are coded.

The following parameters may be used when intra prediction applies.

"dir"—parameter indicating if the inter prediction (uni- or bi-) prediction type "affine"—parameter indicating if the motion data in the block is of affine or translational type "ref_idx0/1"—parameter indicating the reference picture index used for the temporal prediction from the reference picture lists (L0/L1)

"mvd0/1"—parameter related to the motion vector difference to add to the motion vector prediction "mvp_idx0/1"—parameter indicating the index of the motion vector predictor in the motion vector candidate list "amvr" is a Boolean parameter indicating if the adaptive motion vector resolution (AMVR) is used or not for the motion compensation "gbi" (aka bcw) is a Boolean parameter indicating if the Generalized Bi-prediction (GBI) mode is used or not Syntax The tables below give the coding unit and merge syntax.

One can notice several modes are exclusive in the codec, and some tools combinations are disabled.

The following examples can be mentioned:

MRL (associated syntax element intra_luma_ref_idx) and ISP (associated syntax element intra_subpartitions_mode_flag)

CIIP (associated syntax element clip_flag) and skip mode (associated syntax element cu_skip_flag)

TPM (no associated syntax element since it is a leaf of the syntax tree, it is activated if all merge modes parsed before are false) and SBT (associated syntax element cu_sbt_flag)

CIIP and SBT

LFNST (associated syntax element lfnst_idx) and ISP

LFNST only for MIP (associated syntax element intra_mip_flag) when block height or width less than 16

LFNST and MTS (associated syntax element tu_mts_idx)

TPM and AMVP (associated syntax element general_merge_flag is false)

CIIP and AMVP

Coding Unit Syntax

From WC:

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|      !( ( ( cbWidth = = 4 && cbHeight = = 4 ) \|\| modeType = = MODE_TYPE_INTRA ) | |
|       && !sps_ibc_enabled_flag ) ) | |
|      cu_skip_flag[ x0 ][ y0 ] | ae(v) |
|     if( cu_skip_flag[ x0 ][ y0 ] = = 0 && slice_type != I | |
|      && !( cbWidth = = 4 && cbHeight = = 4 ) && modeType = = MODE_TYPE_ALL ) | |
|      pred_mode_flag | ae(v) |
|     if( ( ( slice_type = = I && cu_skip_flag[ x0 ][ y0 ] = =0 ) \|\| | |
|       ( slice_type != I && ( CuPredMode[ chType ][ x0 ][ y0 ] != MODE_INTRA \|\| | |
|        ( cbWidth = = 4 && cbHeight = = 4 && cu_skip_flag[ x0 ][ y0 ] = = 0 ) ) ) ) && | |
|      cbWidth <= 64 && cbHeight <= 64 && modeType != MODE_TYPE_INTER && | |
|      sps_ibc_enabled_flag && treeType != DUAL_TREE_CHROMA ) | |
|      pred_mode_ibc_flag | ae(v) |
|     if( ( ( ( slice_type = = I \|\| ( cbWidth = = 4 && cbHeight = = 4 ) \|\| sps_ibc_enabled_flag ) && | |
|       CuPredMode[ x0 ][ y0 ] = = MODE_INTRA ) \|\| | |
|      ( slice_type != I && !( cbWidth = = 4 && cbHeight = = 4 ) && !sps_ibc_enabled_flag | |
|       && CuPredMode[ x0 ][ y0 ] != MODE_INTRA ) ) && sps_palette_enabled_flag && | |
|      cbWidth <= 64 && cbHeight <= 64 && && cu_skip_flag[ x0 ][ y0 ] = = 0 && | |
|      modeType != MODE_INTER ) | |
|      pred_mode_plt_flag | ae(v) |
|   } | |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|      if( pred_mode_plt_flag ) { | |
|       if( treeType = = DUAL_TREE_LUMA ) | |
|        palette_coding( x0, y0, cbWidth, cbHeight, 0, 1 ) | |
|       else /* SINGLE_TREE */ | |
|        palette_coding( x0, y0, cbWidth, cbHeight, 0, 3 ) | |
|      } else { | |
|       if( sps_bdpcm_enabled_flag && | |
|        cbWidth <= MaxTsSize && cbHeight <= MaxTsSize ) | |
|        intra_bdpcm_flag | ae(v) |
|       if( intra_bdpcm_flag ) | |
|        intra_bdpcm_dir_flag | ae(v) |
|       else { | |
|        if( sps_mip_enabled_flag && | |
|         ( Abs( Log2( cbWidth ) − Log2( cbHeight ) ) <= 2 ) && | |
|          cbWidth <= MaxTbSizeY && cbHeight <= MaxTbSizeY ) | |
|         intra_mip_flag[ x0 ][ y0 ] | ae(v) |
|        if( intra_mip_flag[ x0 ][ y0 ] ) | |
|         intra_mip_mode[ x0 ][ y0 ] | ae(v) |
|        else { | |
|         if( sps_mrl_enabled_flag && ( ( y0 % CtbSizeY ) > 0 ) ) | |
|          intra_luma_ref_idx[ x0 ][ y0 ] | ae(v) |
|         if ( sps_isp_enabled_flag && intra_luma_ref_idx[ x0 ][ y0 ] = = 0 && | |
|          ( cbWidth <= MaxTbSizeY && cbHeight <= MaxTbSizeY ) && | |
|          ( cbWidth * cbHeight > MinTbSizeY * MinTbSizeY ) ) | |
|          intra_subpartitions_mode_flag[ x0 ][ y0 ] | ae(v) |

| | Descriptor |
|---|---|
|         if( intra_subpartitions_mode_flag[ x0 ][ y0 ] == 1 )<br>           intra_subpartitions_split_flag[ x0 ][ y0 ] | ae(v) |
|         if( intra_luma_ref_idx[ x0 ][ y0 ] == 0 )<br>           intra_luma_mpm_flag[ x0 ][ y0 ] | ae(v) |
|         if( intra_luma_mpm_flag[ x0 ][ y0 ] ) {<br>           if( intra_luma_ref_idx[ x0 ][ y0 ] == 0 )<br>               intra_luma_not_planar_flag[ x0 ][ y0 ] | ae(v) |
|            if( intra_luma_not_planar_flag[ x0 ][ y0 ] )<br>               intra_luma_mpm_idx[ x0 ][ y0 ] | ae(v) |
|         } else<br>           intra_luma_mpm_remainder[ x0 ][ y0 ] | ae(v) |
|         }<br>      }<br>    }<br>  }<br>  if( ( treeType == SINGLE_TREE \|\| treeType == DUAL_TREE_CHROMA ) &&<br>      ChromaArrayType != 0 ) {<br>    if ( pred_mode_plt_flag && treeType == DUAL_TREE_CHROMA )<br>      palette_coding( x0, y0, cbWidth / SubWidthC, cbHeight / SubHeightC, 1, 2 )<br>    else {<br>      if( CclmEnabled )<br>        cclm_mode_flag | ae(v) |
|       if( cclm_mode_flag )<br>        cclm_mode_idx | ae(v) |
|       Else<br>        intra_chroma_pred_mode | ae(v) |
|     }<br>  }<br>} else if( treeType != DUAL_TREE_CHROMA ) { /* MODE_INTER or MODE_IBC */<br>  if( cu_skip_flag[ x0 ][ y0 ] == 0 )<br>    general_merge_flag[ x0 ][ y0 ] | ae(v) |
|   if( general_merge_flag[ x0 ][ y0 ] ) {<br>    merge_data( x0, y0, cbWidth, cbHeight, chType )<br>  } else if ( CuPredMode[ chType ][ x0 ][ y0 ] == MODE_IBC ) {<br>    mvd_coding( x0, y0, 0, 0 )<br>    if( MaxNumIbcMergeCand > 1 )<br>      mvp_l0_flag[ x0 ][ y0 ] | ae(v) |
|     if( sps_amvr_enabled_flag &&<br>      ( MvdL0[ x0 ][ y0 ][ 0 ] != 0 \|\| MvdL0[ x0 ][ y0 ][ 1 ] != 0 ) ) {<br>      amvr_precision_idx[ x0 ][ y0 ] | ae(v) |
|     }<br>  } else {<br>    if( slice_type == B )<br>      inter_pred_idc[ x0 ][ y0 ] | ae(v) |
|     if( sps_affine_enabled_flag && cbWidth >= 16 && cbHeight >= 16 ) {<br>      inter_affine_flag[ x0 ][ y0 ] | ae(v) |
|       if( sps_affine_type_flag && inter_affine_flag[ x0 ][ y0 ] )<br>        cu_affine_type_flag[ x0 ][ y0 ] | ae(v) |
|     }<br>    if( sps_smvd_enabled_flag && !mvd_l1_zero_flag &&<br>      inter_pred_idc[ x0 ][ y0 ] == PRED_BI &&<br>      !inter_affine_flag[ x0 ][ y0 ] && RefIdxSymL0 > −1 && RefIdxSymL1 > −1 )<br>      sym_mvd_flag[ x0 ][ y0 ] | ae(v) |
|     if( inter_pred_idc[ x0 ][ y0 ] != PRED_L1 ) {<br>      if( NumRefIdxActive [ 0 ] > 1 && !sym_mvd_flag[ x0 ][ y0 ] )<br>        ref_idx_l0[ x0 ][ y0 ] | ae(v) |
|       mvd_coding( x0, y0, 0, 0 )<br>      if( MotionModelIdc[ x0 ][ y0 ] > 0 )<br>        mvd_coding( x0, y0, 0, 1 )<br>      if(MotionModelIdc[ x0 ][ y0 ] > 1 )<br>        mvd_coding( x0, y0, 0, 2 )<br>      mvp_l0_flag[ x0 ][ y0 ] | ae(v) |
|     } else {<br>      MvdL0[ x0 ][ y0 ][ 0 ] = 0<br>      MvdL0[ x0 ][ y0 ][ 1 ] = 0<br>    }<br>    if( inter_pred_idc[ x0 ][ y0 ] != PRED_L0 ) {<br>      if( NumRefIdxActive[ 1 ] > 1 && !sym_mvd_flag[ x0 ][ y0 ] )<br>        ref_idx_l1[ x0 ][ y0 ] | ae(v) |
|       if( mvd_l1_zero_flag && inter_pred_idc[ x0 ][ y0 ] == PRED_BI ) {<br>        MvdL1[ x0 ][ y0 ][ 0 ] = 0<br>        MvdL1[ x0 ][ y0 ][ 1 ] = 0<br>        MvdCpL1[ x0 ][ y0 ][ 0 ][ 0 ] = 0<br>        MvdCpL1[ x0 ][ y0 ][ 0 ][ 1 ] = 0<br>        MvdCpL1[ x0 ][ y0 ][ 1 ][ 0 ] = 0 | |

|  | Descriptor |
|---|---|
|                 MvdCpL1[ x0 ][ y0 ][ 1 ][ 1 ] = 0 <br>                 MvdCpL1[ x0 ][ y0 ][ 2 ][ 0 ] = 0 <br>                 MvdCpL1[ x0 ][ y0 ][ 2 ][ 1 ] = 0 <br>             } else { <br>               if( sym_mvd_flag[ x0 ][ y0 ] ) { <br>                 MvdL1[ x0 ][ y0 ][ 0 ] = −MvdL0[ x0 ][ y0 ][ 0 ] <br>                 MvdL1[ x0 ][ y0 ][ 1 ] = −MvdL0[ x0 ][ y0 ][ 1 ] <br>               } else <br>                 mvd_coding( x0, y0, 1, 0 ) <br>               if( MotionModelIdc[ x0 ][ y0 ] > 0 ) <br>                 mvd_coding( x0, y0, 1, 1 ) <br>               if(MotionModelIdc[ x0 ][ y0 ] > 1 ) <br>                 mvd_coding( x0, y0, 1, 2 ) <br>               mvp_l1_flag[ x0 ][ y0 ] | ae(v) |
|             } <br>         } else { <br>            MvdL1[ x0 ][ y0 ][ 0 ] = 0 <br>            MvdL1[ x0 ][ y0 ][ 1 ] = 0 <br>         } <br>         if( ( sps_amvr_enabled_flag && inter_affine_flag[ x0 ][ y0 ] = = 0 && <br>             ( MvdL0[ x0 ][ y0 ][ 0 ] != 0 || MvdL0[ x0 ][ y0 ][ 1 ] != 0 || <br>             MvdL1[ x0 ][ y0 ][ 0 ] != 0 || MvdL1[ x0 ][ y0 ][ 1 ] != 0 ) ) || <br>           ( sps_affine_amvr_enabled_flag && inter_affine_flag[ x0 ][ y0 ] = = 1 && <br>             (MvdCpL0[ x0 ][ y0 ][ 0 ][ 0 ] != 0 || MvdCpL0[ x0 ][ y0 ][ 0 ][ 1 ] != 0 || <br>             MvdCpL1[ x0 ][ y0 ][ 0 ][ 0 ] != 0 || MvdCpL1[ x0 ][ y0 ][ 0 ][ 1 ] != 0 || <br>             MvdCpL0[ x0 ][ y0 ][ 1 ][ 0 ] != 0 || MvdCpL0[ x0 ][ y0 ][ 1 ][ 1 ] != 0 || <br>             MvdCpL1[ x0 ][ y0 ][ 1 ][ 0 ] != 0 || MvdCpL1[ x0 ][ y0 ][ 1 ][ 1 ] != 0 || <br>             MvdCpL0[ x0 ][ y0 ][ 2 ][ 0 ] != 0 || MvdCpL0[ x0 ][ y0 ][ 2 ][ 1 ] != 0 || <br>             MvdCpL1[ x0 ][ y0 ][ 2 ][ 0 ] != 0 || MvdCpL1[ x0 ][ y0 ][ 2 ][ 1 ] != 0 ) ) { <br>         amvr_flag[ x0 ][ y0 ] | ae(v) |
|         if( amvr_flag[ x0 ][ y0 ] ) <br>            amvr_precision_idx[ x0 ][ y0 ] | ae(v) |
|         } <br>         if( sps_bcw_enabled_flag && inter_pred_idc[ x0 ][ y0 ] = = PRED_BI && <br>           luma_weight_l0_flag[ ref_idx_l0 [ x0 ][ y0 ] ] = = 0 && <br>           luma_weight_l1_flag[ ref_idx_l1 [ x0 ][ y0 ] ] = = 0 && <br>           chroma_weight_l0_flag[ ref_idx_l0 [ x0 ][ y0 ] ] = = 0 && <br>           chroma_weight_l1_flag[ ref_idx_l1 [ x0 ][ y0 ] ] = = 0 && <br>           cbWidth * cbHeight >= 256 ) <br>           bcw_idx[ x0 ][ y0 ] | ae(v) |
|     } <br> } <br> if( CuPredMode[ chType ][ x0 ][ y0 ] != MODE_INTRA && !pred_mode_plt_flag && <br>     general_merge_flag[ x0 ][ y0 ] = = 0 ) <br>     cu_cbf | ae(v) |
| if( cu_cbf ) { <br>     if( CuPredMode[ chType ][ x0 ][ y0 ] = = MODE_INTER && sps_sbt_enabled_flag <br>         && !ciip_flag[ x0 ][ y0 ] && !MergeTriangleFlag[ x0 ][ y0 ] ) { <br>       if( cbWidth <= MaxSbtSize && cbHeight <= MaxSbtSize ) { <br>         allowSbtVerH = cbWidth >= 8 <br>         allowSbtVerQ = cbWidth >= 16 <br>         allowSbtHorH = cbHeight >= 8 <br>         allowSbtHorQ = cbHeight >= 16 <br>         if( allowSbtVerH || allowSbtHorH || allowSbtVerQ || allowSbtHorQ ) <br>           cu_sbt_flag | ae(v) |
|       } <br>       if( cu_sbt_flag ) { <br>         if( ( allowSbtVerH || allowSbtHorH ) && ( allowSbtVerQ || allowSbtHorQ) ) <br>           cu_sbt_quad_flag | ae(v) |
|         if( (cu_sbt_quad_flag && allowSbtVerQ && allowSbtHorQ ) || <br>           ( !cu_sbt_quad_flag && allowSbtVerH && allowSbtHorH ) ) <br>           cu_sbt_horizontal_flag | ae(v) |
|         cu_sbt_pos_flag | ae(v) |
|       } <br>     } <br>     LfnstDcOnly = 1 <br>     LfnstZeroOutSigCoeffFlag = 1 <br>     transform_tree( x0, y0, cbWidth, cbHeight, treeType ) <br>     lfnstWidth = ( treeType = = DUAL_TREE_CHROMA ) ? cbWidth / SubWidthC <br>                 : cbWidth <br>     lfnstHeight = ( treeType = = DUAL_TREE_CHROMA ) ? cbHeight / SubHeightC <br>                 : cbHeight |  |

| | Descriptor |
|---|---|
| if( Min( lfnstWidth, lfnstHeight ) >= 4 && sps_lfnst_enabled_flag = = 1 &&<br>    CuPredMode[ chType ][ x0 ][ y0 ] = = MODE_INTRA &&<br>    IntraSubPartitionsSplitType = = ISP_NO_SPLIT &&<br>    ( !intra_mip_flag[ x0 ][ y0 ] | | Min( lfnstWidth, lfnstHeight ) >= 16 ) &&<br>    tu_mts_idx[ x0 ][ y0 ] = = 0 && Max( cbWidth, cbHeight ) <= MaxTbSizeY) {<br>  if( LfnstDcOnly = = 0 && LfnstZeroOutSigCoeffFlag = = 1 )<br>    lfnst_idx[ x0 ][ y0 ] | |
|   } | ae(v) |
| } | |

Merge Data Syntax
From VVC Section 7.3.81

| | Descriptor |
|---|---|
| merge_data( x0, y0, cbWidth, cbHeight, chType ) {<br>  if ( CuPredMode[ chType ] [ x0 ][ y0 ] = = MODE_IBC ) {<br>    if( MaxNumIbcMergeCand > 1 )<br>      merge_idx[ x0 ][ y0 ] | |
|   } else {<br>    if( MaxNumSubblockMergeCand > 0 && cbWidth >= 8 && cbHeight >= 8 )<br>      merge_subblock_flag[ x0 ][ y0 ] | ae(v) |
|     if( merge_subblock_flag[ x0 ][ y0 ] = = 1 ) {<br>      if( MaxNumSubblockMergeCand > 1 )<br>        merge_subblock_idx[ x0 ][ y0 ] | ae(v) |
|     } else {<br>      if( ( cbWidth * cbHeight) >= 64 && ( (sps_ciip_enabled_ flag &&<br>        cu_skip_flag[ x0 ][ y0 ] = = 0 && cbWidth < 128 && cbHeight < 128) ||<br>        ( sps_triangle_enabled_flag && MaxNumTriangleMergeCand > 1 &&<br>        slice type = = B ) ) )<br>        regular_merge_flag[ x0 ][ y0 ] | ae(v) |
|       if ( regular_merge_flag[ x0 ][ y0 ] = = 1 ){<br>        if( sps_mmvd_enabled_flag )<br>          mmvd_merge_flag[ x0 ][ y0 ] | ae(v) |
|         if( mmvd_merge_flag[ x0 ][ y0 ] = = 1 ) {<br>          if( MaxNumMergeCand > 1 )<br>            mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else {<br>          if( MaxNumMergeCand > 1 )<br>            merge_idx[ x0 ][ y0 ] | ae(v) |
|         }<br>      } else {<br>        if( sps_ciip_enabled_flag && sps_triangle_enabled_flag &&<br>          MaxNumTriangleMergeCand > 1 && slice_type = = B &&<br>          cu_skip_flag[ x0 ][ y0 ] = = 0 &&<br>          ( cbWidth * cbHeight ) >= 64 && cbWidth < 128 && cbHeight <<br>          128 ) {<br>          ciip_flag[ x0 ][ y0 ] | ae(v) |
|         if( ciip_flag[ x0 ][ y0 ] && MaxNumMergeCand > 1 )<br>          merge_idx[ x0 ][ y0 ] | ae(v) |
|         if( !ciip_flag[ x0 ][ y0 ] && MaxNumTriangleMergeCand > 1 ) {<br>          merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         }<br>      }<br>    }<br>  }<br>} | |

Inferred Mode

In addition to these mode exclusions, some modes or values are automatically inferred in the codec. For example:

In case of IBC mode, the half sample interpolation filter index hpelIfIdx is set equal to 0. In the other cases, hpelIfIdx is deduced from the AMVR (Adaptive Motion Vector Resolution, amvr_resolution_idx). If amvr_resolution_idx is equal to Half-Pixel-resolution, then hpelIfIdx is set equal to 1, else it is set to 0. If the final (reconstructed) motion vector is a half-pixel position and hpelIfIdx is equal to 1, then the interpolation filter IF-1 is used for motion compensation, else the interpolation filter (IF-0, the default one) is used. hpelIfIdx=(amvr_resolution_idx==HalfPelResolution)?1:0

MRL and non MPM (Most Probable Mode) mode: if the MRL index is non 0, then the mode is deduced to be in the MPM list (arbitrary intra mode cannot be set).

CIIP intra mode: the intra part always uses the planar mode (arbitrary intra mode cannot be set).

MTS (Multiple Transform Set) is reduced when ISP or SBT are used

The merge index in case of MMVD (Merge Motion Vector Difference): only index 0 or 1 can be set, corresponding to the first or second merge candidate. Others merge candidates cannot be set.

Entropy coding with CABAC

In HEVC and VVC, a context based binary arithmetic coder (CABAC) can be used for entropy coding. There is another coding mode, called "Bypass" coding, that is not discussed here. The bypass mode for coding a bit consists in simply coding the bit value in the bit-stream.

For coding/decoding a syntax element, CABAC works as follows:
- the syntax element is first binarized into a string of bins; then for each bin
  - a context CTX is selected; it is associated to a context model that stores the contextual probability of the bin being "1" or "0; this contextual probability corresponds to the estimated conditional probability that the bin takes the value b knowing the context value CTX, P(b/CTX);
    - the selection is based on contextual information, such as already-coded symbols (syntax elements) in the neighborhood of the current symbol (syntax element) to encode, the CU/PU/TU size or shape, the slice type.
  - the bin is coded/decoded using an arithmetic coder according to the contextual probability P(b/CTX);
  - once coded, the contextual probability, P0=P(0/CTX) or P1=P(1/CTX), is updated.

With arithmetic coders, the value (and initial value) of the probabilities P0/P1 has an important impact on the number of generated bits. For example, if a bin 1 is coded with a probability P1 of low value, it will require more bits than if the probability P1 is of high value.

In the cases described above, while it reduced the encoder complexity because it reduces the combinatory between modes (when two modes can only be used exclusively, the encoder has only to test the usage of each mode separately; the test of both modes combined is not made), it may impact the raw performance of the codec by removing some flexibility.

The described embodiments propose to transform the above hard constraints into softer constraints using a combination of syntax changes, ad-hoc entropy contexts, entropy initial probability parameters and encoding choices.

As stated above, bad complexity/gains tradeoff combination or mode choices were normatively removed from the encoding choices.

The described aspects provide a method to increase the codec flexibility by either keeping the same performance when using a low complexity encoder, i.e. the complexity/gains tradeoff is the same or by enabling these modes for higher complexity encoder by using adapted syntax, ad-hoc contexts, CABAC parameters and encoding methods. In this case, the encoder is more complex, but the gains are expected to be higher. It can for example be useful for non-real-time encoders, such as in video on demand applications, where the video streams are encoded once, without constraints of real-time delivery.

We propose to transform above hard constraints in the specification into softer constraints using a combination of
- syntax changes (e.g. syntax element removed or changed depending on another parameter)
- ad-hoc entropy contexts,
- entropy initial probability parameters
- encoding choices.

Mode Exclusion

Figure 14:
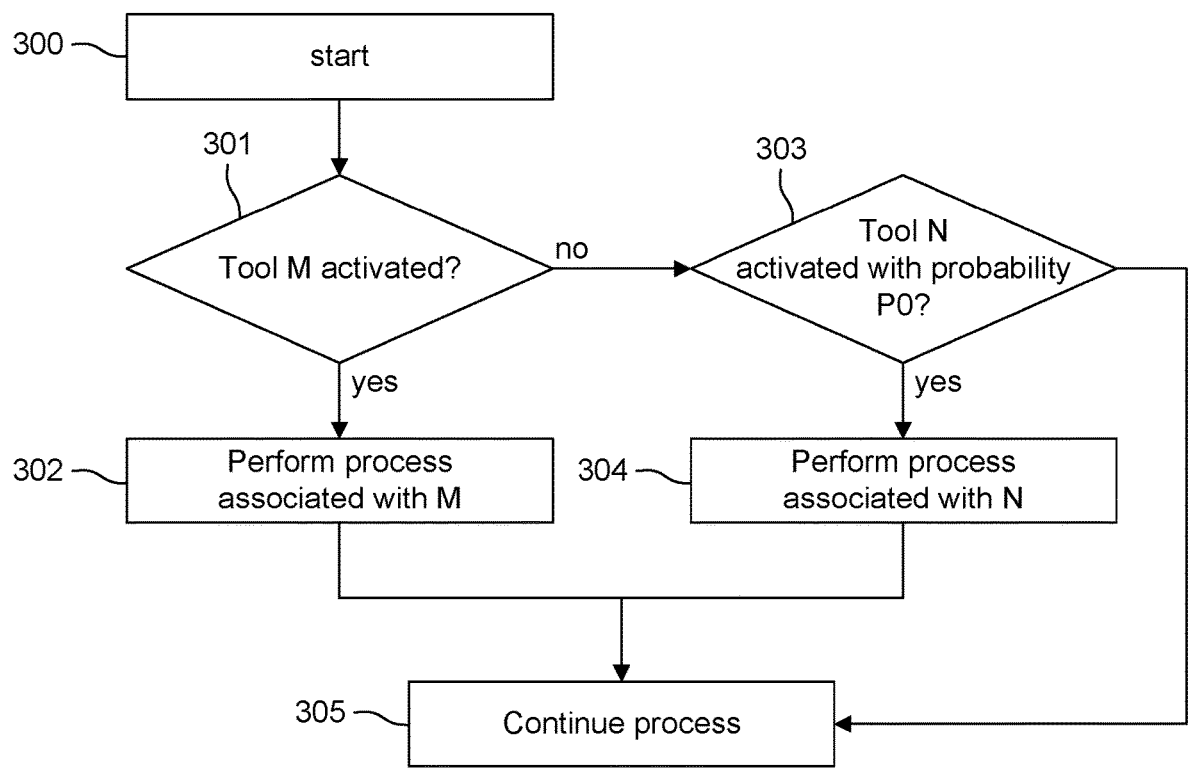
FIG. 14 illustrates a mode exclusion diagram.
Figure 15:
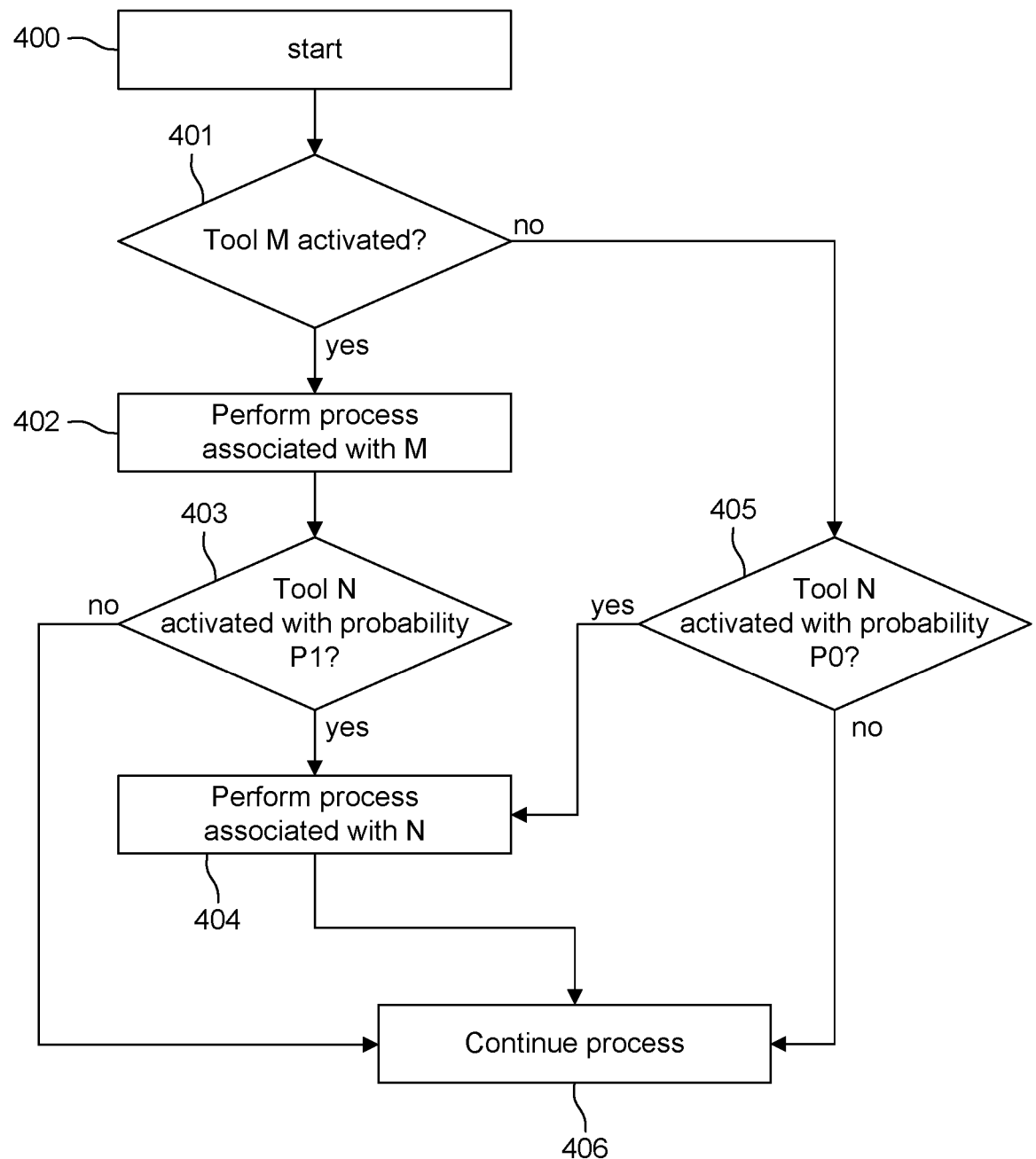
FIG. 15 illustrates a non-exclusive mode diagram.

In FIG. 14 and FIG. 15 we show the overall change in the process in going from hard exclusivity to soft one with two coding tools M and N. The coding tool N becomes available even if the coding tool M is activated with an associated probability model P1 (see below for details).

FIG. 14 illustrates the "mode exclusion" case. It corresponds to the prior-art where the two modes M and N are exclusive. Step 300 corresponds to the start of the overall process. In step 301, the activation of tool M is checked (e.g. by testing a flag).

If tool M is activated, then the tool M is performed in step 302. Then the process goes to step 305 of continuation of the overall process.

If the tool M is not activated, the activation of tool N is checked (step 303). A probability P0 of activating tool N is defined. If tool N is activated, then the tool N is performed in step 304. Then the process goes to step 305 of continuation of the overall process. If the tool N is not activated, the process goes to step 305 of continuation of the overall process.

In this case, tool N can be activated only if tool M is not activated. Modes M and N usage is exclusive.

FIG. 15 illustrates the "non-exclusive mode" case. It corresponds to one aspect of the described embodiments where the modes M and N can be used non-exclusively. Step 400 corresponds to the start of the overall process. In step 401, the activation of tool M is checked.

If tool M is activated, then the tool M is performed in step 402. Then the activation of tool N is checked in step 403. A probability P1 of activating tool N is defined. If tool N is activated, then the tool N is performed in step 404. Then the process goes to step 406 of continuation of the overall process. If the tool N is not activated, the process goes to step 406 of continuation of the overall process.

If the tool M is not activated, the activation of tool N is checked (step 405). A probability P0 of activating tool N is defined. If tool N is activated, then the tool N is performed in step 403. Then the process goes to step 406 of continuation of the overall process. If the tool N is not activated, the process goes to step 406 of continuation of the overall process.

In this case, tool N can be activated in both cases where tool M is activated, or tool M is not activated. Modes M and N usage is not exclusive.

Mode Inference

Figure 16:
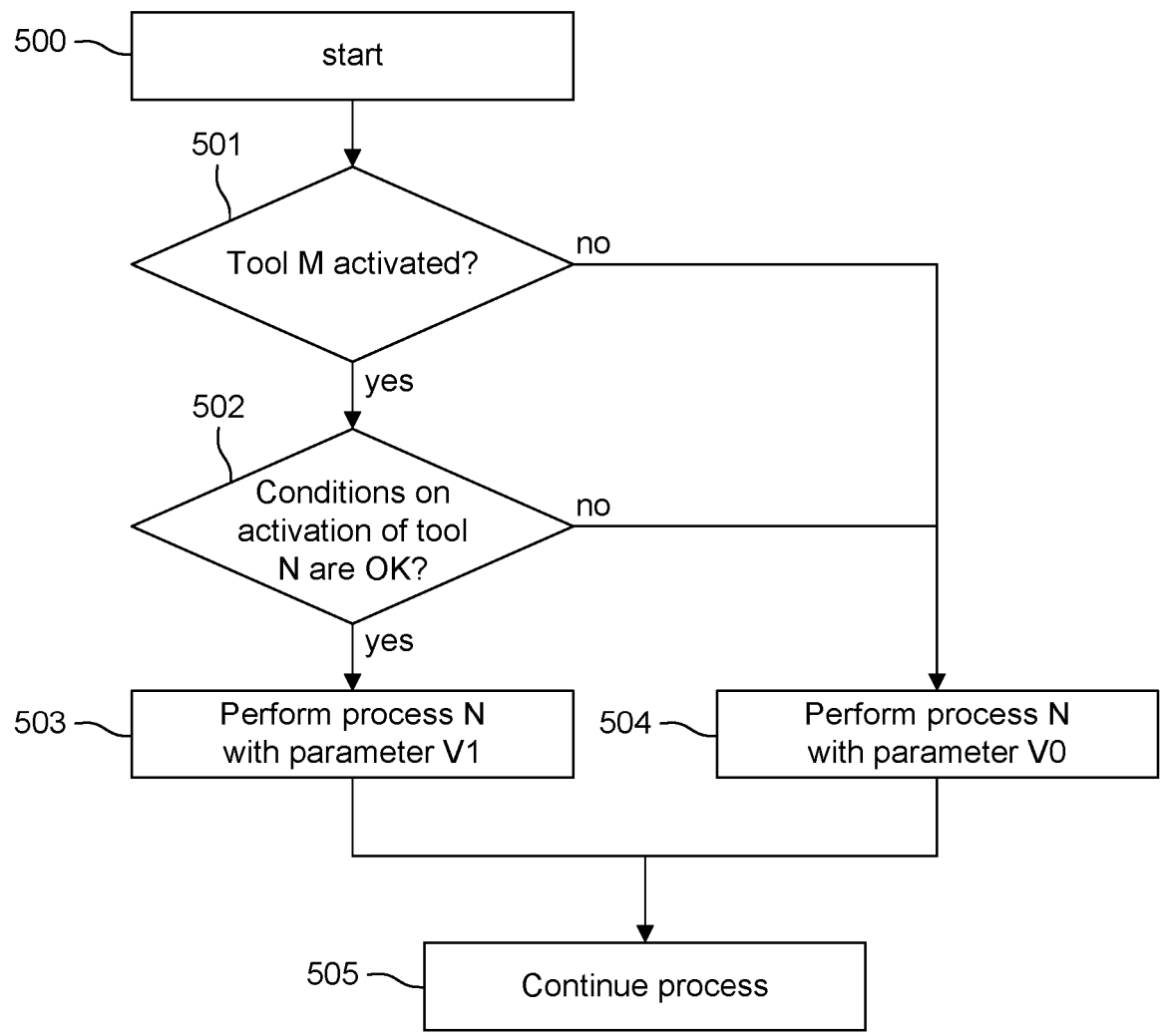
FIG. 16 illustrates an overview of value inference process.
Figure 17:
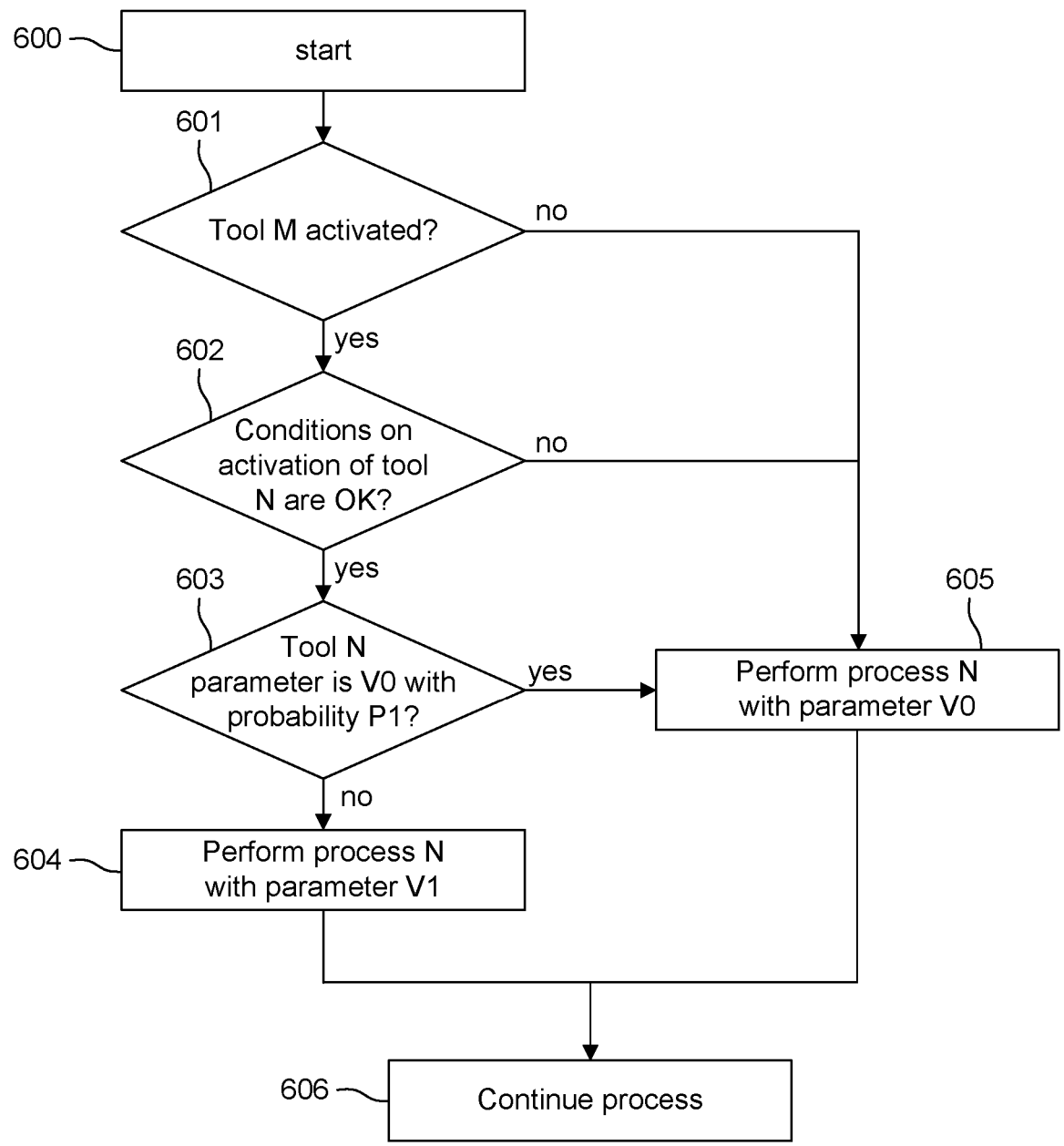
FIG. 17 illustrates an overview signaled parameter.

In FIGS. 16 and 17 we show the overall transformation of an inferred value to a signaled value with associated probability (see below for details). Here two tools M and N are considered, and tool N is controlled by a parameter.

FIG. 16 illustrates the "value inference" case. It corresponds to the prior-art where the parameter of tool N is inferred (not coded). Step 500 corresponds to the start of the overall process. In step 501, the activation of tool M is checked.

If tool M is activated, activation conditions of tool N are checked in step 502. If activation conditions of tool N are true, tool N is performed with a parameter value v1 in step 503. Then the process goes to step 505 of continuation of the overall process. If activation conditions of tool N are false, tool N is performed with a parameter value v0 in step 504. Then the process goes to step 505 of continuation of the overall process. Tool M process is not shown on the figure is performed before or after the tool N.

In this case, the parameter associated to tool N is always inferred.

FIG. 17 illustrates the "signaled parameter" case. It corresponds to one aspect of the described embodiments where the parameter of tool N is explicitly signaled. Step 600 corresponds to the start of the overall process. In step 601, the activation of tool M is checked.

If tool M is activated, activation conditions of tool N are checked in step 602. If activation conditions of tool N are true, the parameter value of tool N is checked (and possibly decoded from the stream). If parameter is v0, tool N is activated with parameter value v0 in step 605. Then the process goes to step 606 of continuation of the overall process. Otherwise, tool N is activated with parameter value v1 in step 604. Then the process goes to step 606 of continuation of the overall process.

If tool M is not activated, tool N is activated with parameter value v0 in step 605. Then the process goes to step 606 of continuation of the overall process. Tool M process is not shown on the figure is performed before or after the tool N.

In this case, the parameter associated to tool N is not inferred but decoded or deduced from specific conditions applying to tool N.

Syntax Change

The first change is a change in the syntax covering the mode exclusion and for the parameter inference aspects.

Regarding the mode exclusion aspect, the mode exclusion is removed. The activation of mode N is no longer dependent on the activation of mode M. The condition of activation of tool N is transformed into an adhoc new CABAC context.

Regarding the inferred value aspect, a new syntax element is introduced to explicitly encode the value. The new syntax element uses one or more new adhoc CABAC contexts to replace the parameter inference.

In a variant, the mode exclusion aspect (mode exclusion is removed) and/or the inferred value aspects (new syntax element to explicitly encode the value) are controlled/activated with a condition of a coded parameter (preferably in the high-level syntax, e.g. coded in the slice header, picture parameters set (PPS), sequence parameter set (SPS), adaptation parameter set (APS) or decoding parameter set).

CABAC Context Change

Mode Exclusion

As an entropy coder (CABAC in this case) is used to encode the use of tool N, a different bin is used when tool M is activated. A new CABAC context is needed to separate the case where the mode M is activated or not. A condition on the mode M activation is added for CABAC context derivation of the syntax element associated with the mode N. The coding of the first bin (when the mode M is not activated) remains unchanged and use the same probability model P0 (initial value being the same).

Value Inference

As an entropy coder (CABAC in this case) is used to encode the value V0 or V1 associated with the tool N. The probability model P1 associated with the coding of the value V (equal to V0 or V1) is set such as it has a high probability of being V1 (the value which was previously inferred).

CABAC Initial Value Adaptation

Mode Exclusion

It is now described how to set the new probability model P1. This bin is initialized with a low probability in order to not impact the coding performance of an encoder choosing to always exclude the tool N when the tool M is in use.

Indeed, if a mode is rarely used but the associated probability of use in the CABAC model is high, then a lot of bits will be used to signal the non-use of the mode. On the other hand, if the probability is low, then not using this mode will have no/very little impact on the rate compared to a codec where the mode is not available.

In the following, we explain the rationale of the CABAC initialization process change.

In WC, the initial probability value of the CABAC model is given by a linear model depending on the QP (quantization parameter), controlled by two parameters a (multiplicative factor, or slope) and b (offset). Both the slope a and the offset b are hardcoded in the specifications for a given bin corresponding to a syntax element. As the CABAC update the probability at each read bin, 2 "window sizes" are also used to update the symbol probability. Depending on the window size, the probability update will be fast or slow.

For example, the CIIP flag parameters are as follow: a=0.024 and b=0.29 (here we express the coefficient as floating point value for clarity purpose). It then gives the initial probability uses by CABAC, depending on the QP:

$$proba(QP)=(0.024/2)*(QP-16)+0.29$$

In practice, the probability is approximatively 0.5 for a QP of 34.

In order to not penalize a low complexity encoder that would not test the mode N when the mode M is activated, we propose to initialize the CABAC probability with a low probability model, with a and b small. Hence, the coding of the bin indicating that the mode N is not used (e.g. bin 0) will require very few bits, since probability of having a bin 1 is low, and conversely, of having a bin 0 is high. For example: a=0 and b=0.008. In current VTM-6.0, using the current slope and offset coding, it corresponds to an initialization parameter of CABAC of 32. Other values keeping the initially probability low can be used. For example, keeping the initial probability function of the QP: a=0.0117 b=0.008. In current VTM-6.0, using the current slope and offset coding, it corresponds to an initialization parameter of CABAC of 40.

By using these initial probability models, a low complexity encoder, like the one described in WC, not performing mode N when N is activated does not have performance penalty (performance remains roughly the same). But a more complex encoder can leverage the new available mode if needed. Indeed, such an encoder can test more mode combinations, which is in most cases beneficial in terms of compression gain.

In a variant, the window size associated with the new syntax element is shorten in order to adapt more quickly the probability model (see below for details).

Value Inference

The probability initialization principle is the same as above: a low probability is set to the value which was not previously inferred.

Variant

In case the logic for the new introduced mode or non-inferred value is inverted, the probability initial value is set to a value close to 1 (instead of close to 0).

Encoding Method

In order to improve the performance of high complexity encoder, the probability of using the new introduce mode combination/value needs to be rectified to its correct expected value. However, as the probability model has been fixed for both encoder/decoder (see above parameters a, b and window size), the initial cost of choosing the new mode might be too high for the new mode to be selected. When evaluating the cost of activating mode N, as its probability has a low value, its costs is high, so mode N is strongly penalized and has therefore very few chances to be selected. In such a case, as the mode N is rarely selected, its probability of being used always remains small, and there are very few chances that it will be used.

In order to change the probability associated with the mode, without changing the initial value, a possible encoding method consists in computing a biased RD (Rate-Distortion) cost for the mode N when the mode M is activated for the first few blocks using the mode N:

$$C = D + \lambda(R - \alpha)$$

Where D is the distortion, R the rate and λ the rate-distortion parameter in the classical RD cost estimation. a is a fractional bit cost (positive) computed to favor the mode N when the mode M is activated. For example, the factor a can be computed exactly such as (R-a) is equal to 1 bit, corresponding to a probability of 0.5 for the current coded bin. The mode N is therefore not penalized, even if its probability is small, and can be chosen by the encoder as soon as it offers a better distortion value than when not used the mode. When processing the successive blocks, the probability model progressively converges to the actual probability of usage of the mode N.

After having processed a sufficient number of blocks, i.e. when the probability model converged to a good estimation of the true mode usage probability, the factor a is decreased down to 0 in order to use the real rate cost R in the RD cost equation. The stabilization of the probability model can be assessed by evaluating the probability value P0 or P1 variations, while bins are coded. If the variation is below a given threshold (e.g. 0.01) then the model is considered to be stable and a can start to be decreased. Alternatively, the decreasing of a can be decided once a given number of blocks (e.g. 20) has been processed.

The number of block adaptation depends on the window size fixed in the encoder/decoder. The shorter the window size, the quicker the adaptation is.

Example of Hard to Soft Mode Change

CIIP Mode in Skip Mode

Here the mode M is skip (i.e. merge without residual) and N is the CIIP mode.

The first change concerns the syntax in the coding unit data: the cu_skip_flag which enable CIIP is no longer dependent on the cu_skip_flag (which denote the skip mode activation). Moreover, condition to read or not the regular merge mode flag are also adapted in order to avoid useless reading in case of non activated CIIP and triangle.

```
if( ( cbWidth * cbHeight) >= 64 && ( (sps_ciip_enabled_flag &&
        cu_skip_flag[x0][y0] == 0 && cbWidth < 128 && cbHeight < 128) ||
    ( sps_triangle_enabled_flag && MaxNumTriangleMerge-
    Cand > 1 && slice_type == B ) ) )
    regular_merge_flag[ x0 ][ y0 ]                                    ae(v)
```

```
if( sps_ciip_enabled_flag && sps_triangle_enabled_flag &&
    MaxNumTriangleMergeCand > 1 && slice_type == B &&
    cu_skip_flag[x0][y0] == 0 &&
    ( cbWidth * cbHeight ) >= 64 && cbWidth < 128 &&
    cbHeight < 128 ) {
    ciip_flag[ x0 ][ y0 ]                                             ae(v)
```

CABAC Adaptation

Figure 18:
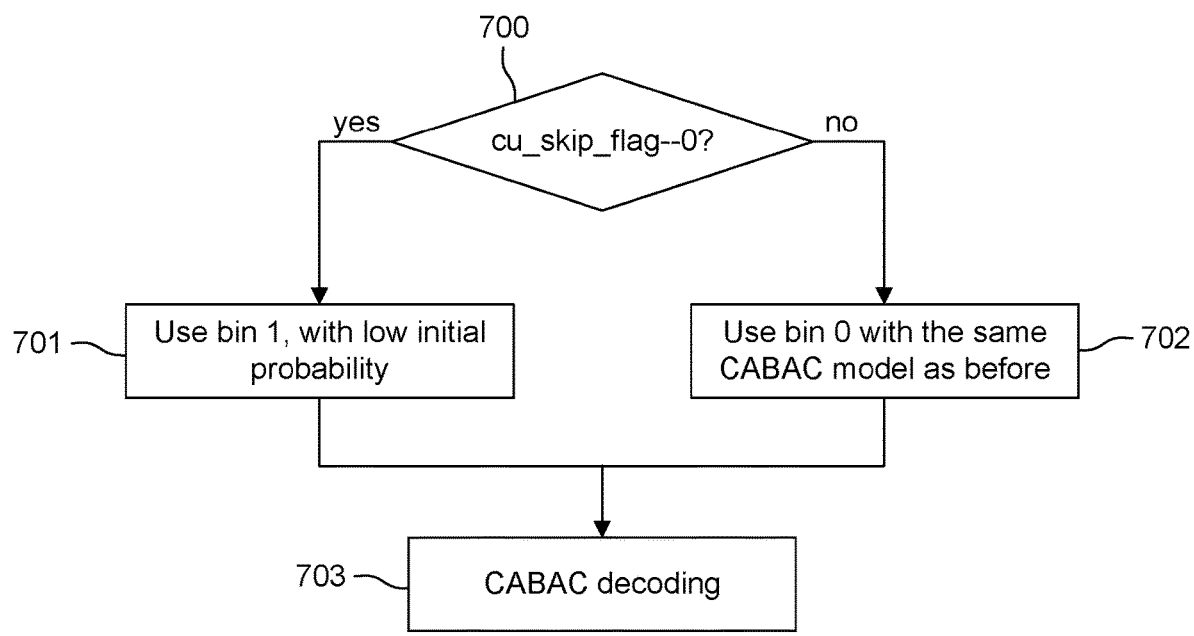
FIG. 18 illustrates entropy coding of CHP flag.

One embodiment adds a new context depending on the skip flag (cu_skip_flag). If the skip flag is 0, the CABAC coding is done as before. If the skip flag is 1, then another bin is used to code the "ciip_flag" (see FIG. 18).

In step 700, cu_skip_flag is checked. If cu_skip_flag is equal to 0, the bin 1 is used with an initial probability of low value (step 701). Otherwise, the bin 0 is used with a CABAC model (including an initial probability) similar to the case without the herein described aspects (step 702). Then CABAC decoding applies in step 703.

MRL and ISP

Here M denotes the MRL tool and N denotes the ISP tool.

```
if ( sps_isp_enabled_flag && intra_luma_ref_idx[x0][y0] == 0
    &&
    ( cbWidth <= MaxTbSizeY && cbHeight <= MaxTbSizeY ) &&
    ( cbWidth * cbHeight > MinTbSizeY * MinTbSizeY ) )
    intra_subpartitions_mode_flag[ x0 ][ y0 ]                         ae(v)
```

The ISP mode is allowed even when the MRL index is not 0.

CABAC Adaptation

A new context depending on the MRL index (intra_luma_ref_idx) is introduced to encode the intra_subpartitions_mode_flag. Again, when MRL index is 0, the same CABAC process as before is done, when it is not, a new bin with low initial probability is used to encode the flag. The low probability settings process is similar to the one described before.

TPM and SBT

Here M denotes the TPM tool and N denotes the SBT tool. The SBT mode is allowed even when the TPM mode is activated.

```
if( CuPredMode[ chType ][ x0 ][ y0 ] == MODE_INTER &&
    sps_sbt_enabled_flag
        && !ciip_flag[ x0 ][ y0 ] && !MergeTriangleFlag[x0][y0]){
    if( cbWidth <= MaxSbtSize && cbHeight <= MaxSbtSize ) {
        allowSbtVerH = cbWidth >= 8
        allowSbtVerQ = cbWidth >= 16
        allowSbtHorH = cbHeight >= 8
        allowSbtHorQ = cbHeight >= 16
        if( allowSbtVerH || allowSbtHorH || allowSbtVerQ ||
            allowSbtHorQ )
            cu_sbt_flag                                               ae(v)
}
```

CABAC Adaptation

A new context depending on the TPM mode (MergeTriangleFlag) is introduced to encode the cu_sbt_flag. Again, when MergeTriangleFlag flag is 0, the same CABAC process as before is done, when it is not, a new bin with low initial probability is used to encode the flag. The low probability settings process is similar to the one described before.

CIIP and SBT

Here M denotes the CIIP tool and N denotes the SBT tool. The SBT mode is allowed even when the CIIP mode is activated.

```
if( CuPredMode[ chType ][ x0 ][ y0 ] = = MODE_INTER && sps_sbt_enabled_flag
    && !ciip_flag[x0][y0] && !MergeTriangleFlag[ x0 ][ y0 ] ) {
    if( cbWidth <= MaxSbtSize && cbHeight <= MaxSbtSize ) {
        allowSbtVerH = cbWidth >= 8
        allowSbtVerQ = cbWidth >= 16
        allowSbtHorH = cbHeight >= 8
        allowSbtHorQ = cbHeight >= 16
        if( allowSbtVerH || allowSbtHorH || allowSbtVerQ || allowSbtHorQ )
            cu_sbt_flag                                                              ae(v)
}
```

CABAC Adaptation

A new context depending on the CIIP mode (ciip_flag) is introduced to encode the cu_sbt_flag. When ciip_flag flag is 0, the same CABAC process as before is done, when it is not, a new bin with low initial probability is used to encode the flag. The low probability settings process is similar to the one described before.

LFNST (Low Frequency Non-Separable Transform) and ISP

Here M denotes the ISP tool and N denotes the LFNST tool. The LFNST mode is allowed even when the ISP mode is activated.

```
if( Min( lfnstWidth, lfnstHeight ) >= 4 && sps_lfnst_enabled_
flag = = 1 &&
    CuPredMode[ chType ][ x0 ][ y0 ] = = MODE_INTRA &&
    IntraSubPartitionsSplitType = = ISP_NO_SPLIT &&
    ( !intra_mip_flag[ x0 ][ y0 ] || Min( lfnstWidth, lfnstHeight ) >=
    16 ) &&
```

-continued

```
    tu_mts_idx[ x0 ][ y0 ] = = 0 && Max( cbWidth, cbHeight ) <=
    MaxTbSizeY) {
        if( LfnstDcOnly = = 0 && LfnstZeroOutSigCoeffFlag = = 1 )
            lfnst_idx[ x0 ][ y0 ]                                                    ae(v)
}
```

CABAC Adaptation

A new context depending on the ISP mode (IntraSubPartitionsSplitType) is introduced to encode the lfnst_idx. When IntraSubPartitionsSplitType is ISP_NO_SPLIT, the same CABAC process as before is done, when it is not, a new bin with low initial probability is used to encode the flag. The low probability settings process is similar to the one described before.

LFNST Only for MIP (Matrix Intra Prediction) when Block Height or Width Less than 16

Here M denotes the MIP tool and N denotes the LFNST tool. The LFNST mode is allowed even when the MIP mode is activated and block size (either height or width) is smaller than 1

```
if( Min( lfnstWidth, lfnstHeight ) >= 4 && sps_lfnst_enabled_flag = = 1 &&
    CuPredMode[ chType ][ x0 ][ y0 ] = = MODE_INTRA &&
    IntraSubPartitionsSplitType = = ISP_NO_SPLIT &&
    ( !intra_mip_flag[ x0 ][ y0 ] || Min( lfnstWidth, lfnstHeight ) >= 16 ) &&
    tu_mts_idx[ x0 ][ y0 ] = = 0 && Max( cbWidth, cbHeight ) <= MaxTbSizeY) {
        if( LfnstDcOnly = = 0 & LfnstZeroOutSigCoeffFlag = = 1 )
            lfnst_idx[ x0 ][ y0 ]                                                    ae(v)
}
```

CABAC Adaptation

A new context depending on the MIP mode (intra_mip_flag) and block size is introduced to encode the lfnst_idx. When intra_mip_flag is 0 or width and height are greater than 16, the same CABAC process as before is done, when it is not and, a new bin with low initial probability is used to encode the flag. The low probability settings process is similar to the one described before.

Switchable Filter

For inferred modes or index, an additional syntax element is added to explicitly code the modes or index.

The half sample interpolation filter index hpelIfIdx is deduced from the AMVR (Adaptive Motion Vector Resolution) mode (being Half-Pixel): in this case, an index 0 or 1 is coded to indicate which interpolation filter is used.

```
if( ( sps_amvr_enabled_flag && inter_affine_flag[ x0 ][ y0 ] = = 0 &&
    ( MvdL0[ x0 ][ y0 ][ 0 ] != 0 || MvdL0[ x0 ][ y0 ][ 1 ] != 0 ||
    MvdL1[ x0 ][ y0 ][ 0 ] != 0 || MvdL1[ x0 ][ y0 ][ 1 ] != 0 ) ) ||
    ( sps_affine_amvr_enabled_flag && inter_affine_flag[ x0 ][ y0 ] = = 1 &&
    ( MvdCpL0[ x0 ][ y0 ][ 0 ][ 0 ] != 0 || MvdCpL0[ x0 ][ y0 ][ 0 ][ 1 ] != 0 ||
    MvdCpL1[ x0 ][ y0 ][ 0 ][ 0 ] != 0 || MvdCpL1[ x0 ][ y0 ][ 0 ][ 1 ] != 0 ||
    MvdCpL0[ x0 ][ y0 ][ 1 ][ 0 ] != 0 || MvdCpL0[ x0 ][ y0 ][ 1 ][ 1 ] != 0 ||
    MvdCpL1[ x0 ][ y0 ][ 1 ][ 0 ] != 0 || MvdCpL1[ x0 ][ y0 ][ 1 ][ 1 ] != 0 ||
    MvdCpL0[ x0 ][ y0 ][ 2 ][ 0 ] != 0 || MvdCpL0[ x0 ][ y0 ][ 2 ][ 1 ] != 0 ||
```

-continued

```
    MvdCpL1[ x0 ][ y0 ][ 2 ] [ 0 ] != 0 | | MvdCpL1[ x0 ][ y0 ][ 2 ] [ 1 ] != 0 ) ) {
  amvr_flag[ x0 ][ y0 ]                                                              ae(v)
  if( amvr_flag[ x0 ][ y0 ] ) {
    amvr_precision_idx[ x0 ][ y0 ]                                                   ae(v)
    if (amvr_precision_idx[ x0 ][ y0 ] == HalfPelIdx)
       hpelIfIdx[ x0 ][ y0 ]                                                         ae(v)
  }
}
```

In case of intra block copy mode (IBC), the value of hpellfIdx is set equal to 0.

During the decoding process, if the syntax element hpellfIdx is not present (e.g. merge mode), the value of hpellfIdx is inferred to (amvr_precision_idx[x0][y0]==HalfPelIdx)?IF-: IF-0.

In a variant, the coding of hpellfIdx is conditioned to the high-level parameter "enabled_interpolation_filter_flag". If enabled_interpolation_filter_flag=0, the syntax element is not present and is inferred (e.g. inferred to default, for example IF-0, or inferred to "amvr_precision_idx[x0][y0]==HalfPelIdx").

```
  ...                                                                                ae(v)
  if( amvr_flag[ x0 ][ y0 ] ) {
    amvr_precision_idx[ x0 ][ y0 ]                                                   ae(v)
    if ( amvr_precision_idx[ x0 ][ y0 ] == HalfPelIdx &&
        enabled_interpolation_filter_flag )
       hpelIfIdx[ x0 ][ y0 ]                                                         ae(v)
  }
}
```

In another variant, the coding of hpellfIdx is conditioned to the high-level parameter "enabled_interpolation_filter_flag", but not on the value of amvr_precision_idx.

```
  ...                                                                                ae(v)
  if( amvr_flag[ x0 ][ y0 ] ) {
    amvr_precision_idx[ x0 ][ y0 ]                                                   ae(v)
```

-continued

```
    if (enabled_interpolation_filter_flag )
       hpelIfIdx[ x0 ][ y0 ]                                                         ae(v)
  }
}
```

CABAC Adaptation

The new syntax element hpellfIdx is CABAC coded with a high initial probability. The high probability settings process is similar to the one described before.

In a variant, the initial probability depends on the value of "enabled_interpolation_filter_flag".

Non MPM with MRL

When MRL index is not 0, the intra mode is allowed to be a non mpm, hence the flag intra_luma_mpm_flag is read in all cases.

```
    if(intra_luma_ref_idx[x0][y0] == 0)
      intra_luma_mpm_flag[ x0 ][ y0 ]                                                ae(v)
```

CABAC Adaptation

A new context depending on the MRL index is introduced to encode the intra_luma_mpm_flag. When MRL index is 0, the same CABAC process as before is done, when it is not, a new bin with low initial probability is used to encode the flag.

Non Planar Mode in CIIP

When CIIP is activated, all intra modes are allowed. To do this, the same syntax as in intra mode parsing is performed when the flag ciip_flag is true: MIP mode, MRL, MPM etc. are parsed.

```
if( sps_ciip_enabled_flag && sps_triangle_enabled_flag &&
    MaxNumTriangleMergeCand > 1 && slice_type = = B &&
    ( cbWidth * cbHeight ) >= 64 && cbWidth < 128 && cbHeight < 128 )
  ciip_flag[ x0 ][ y0 ]                                                              ae(v)
  if (ciip_flag[ x0 ][ y0 ]) {
    if( sps_mip_enabled_flag &&
       ( Abs( Log2( cbWidth ) − Log2( cbHeight) ) <= 2 ) &&
        cbWidth <= MaxTbSizeY && cbHeight <= MaxTbSizeY )
      intra_mip_flag[ x0 ][ y0 ]                                                     ae(v)
    if( intra_mip_flag[ x0 ][ y0 ] )
      intra_mip_mode[ x0 ][ y0 ]                                                     ae(v)
    else {
      if( sps_mrl_enabled_flag && ( ( y0 % CtbSizeY ) > 0 ) )
        intra_luma_ref_idx[ x0 ][ y0 ]                                               ae(v)
      if( intra_luma_ref_idx[ x0 ][ y0 ] = = 0 )
        intra_luma_mpm_flag[ x0 ][ y0 ]                                              ae(v)
      if( intra_luma_mpm_flag[ x0 ][ y0 ] ) {
        if( intra_luma_ref_idx[ x0 ][ y0 ] = = 0 )
          intra_luma_not_planar_flag[ x0 ][ y0 ]                                     ae(v)
        if( intra_luma_not_planar_flag[ x0 ][ y0 ] )
          intra_luma_mpm_idx[ x0 ][ y0 ]                                             ae(v)
      } else
        intra_luma_mpm_remainder[ x0 ][ y0 ]                                         ae(v)
    }
  }
}
```

CABAC Adaptation

All the following flags get a new context bin when ciip_flag is true, with the following adaptation:

intra_mip_flag: the initial probability is set to a low probability intra_luma_ref_idx: the initial probability is set to a high probability to have index 0 intra_luma_mpm_flag: the initial probability is set to a high probability intra_luma_not-planar_flag: the initial probability is set to low Merge Index of MMVD

```
if( MaxNumMergeCand > 1 ) {
    mmvd_cand_flag[ x0 ][ y0 ]                    ae(v)
    if (mmvd_cand_flag[ x0 ][ y0 ]) {
        mmvd_merge_idx_minus1[ x0 ][ y0]          ae(v)
    }
```

A mmvd_merge_idx is coded allowing to set any merge candidate in the list.

In a variant, the coding of "mmvd_merge_idx" is conditioned to the high-level parameter "enabled_mmvd_merge_idx_flag". If enabled_mmvd_merge_idx_flag=0, then "mmvd_merge_idx_minus1" is not present and inferred to (rmvd_mdcand_flag[x0] [y0] L?1:0).

```
if( MaxNumMergeCand > 1 ) {
    mmvd_cand_flag[ x0 ][ y0 ]                    ae(v)
    if ( mmvd_cand_flag[ x0 ][ y0 ] &&
        enabled_mmvd_merge_idx_flag ) {
        mmvd_merge_idx_minus1[ x0 ][ y0]          ae(v)
    }
```

CABAC Adaptation

This adaptation uses the same method as merge_idx, except that the first 2 bits are CABAC coded.

The first bit is CABAC coded with an initial probability similar to the original mmvd_cand_flag. The second bit is CABAC coded with a low initial probability (stating that the index has great probability to be 1 if the index is not 0). Remaining bits are coded as by-pass as in the merge index process.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all the different aspects can be combined and interchanged to provide further aspects. Moreover, the aspects can be combined and interchanged with aspects described in earlier filings as well.

Figure 9:
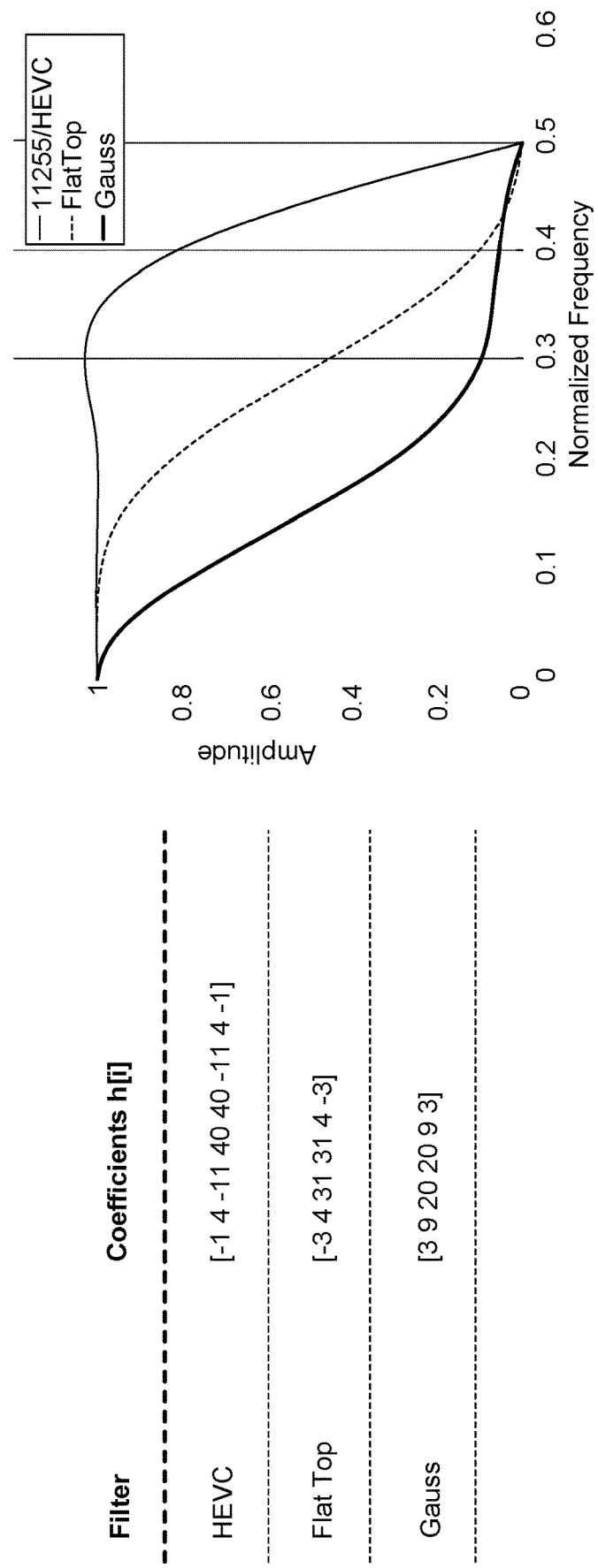
FIG. 9 illustrates example of proposed interpolation filters.
Figure 12:
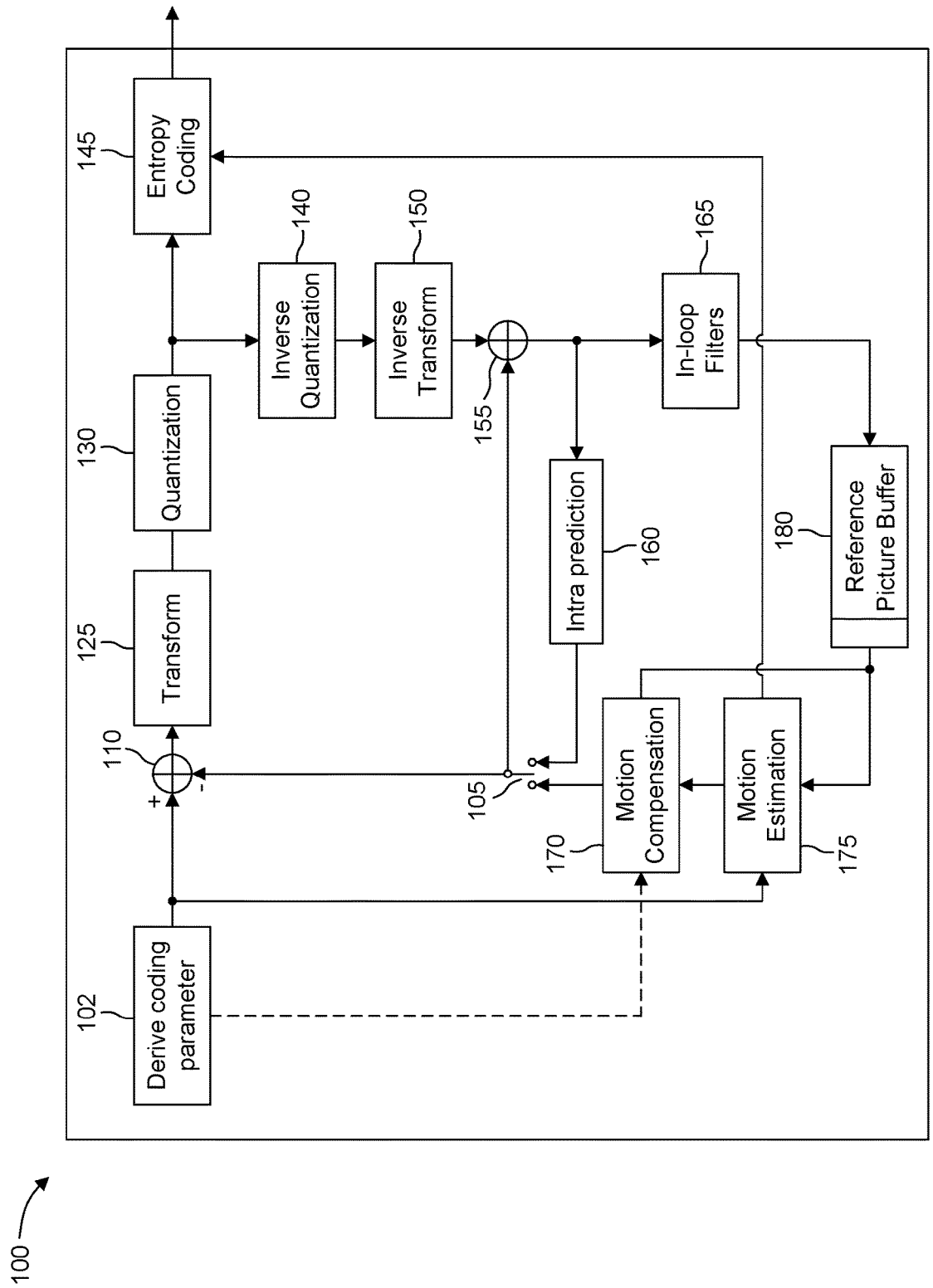
FIG. 12 illustrates a standard, generic, video compression scheme (encoder).
Figure 13:
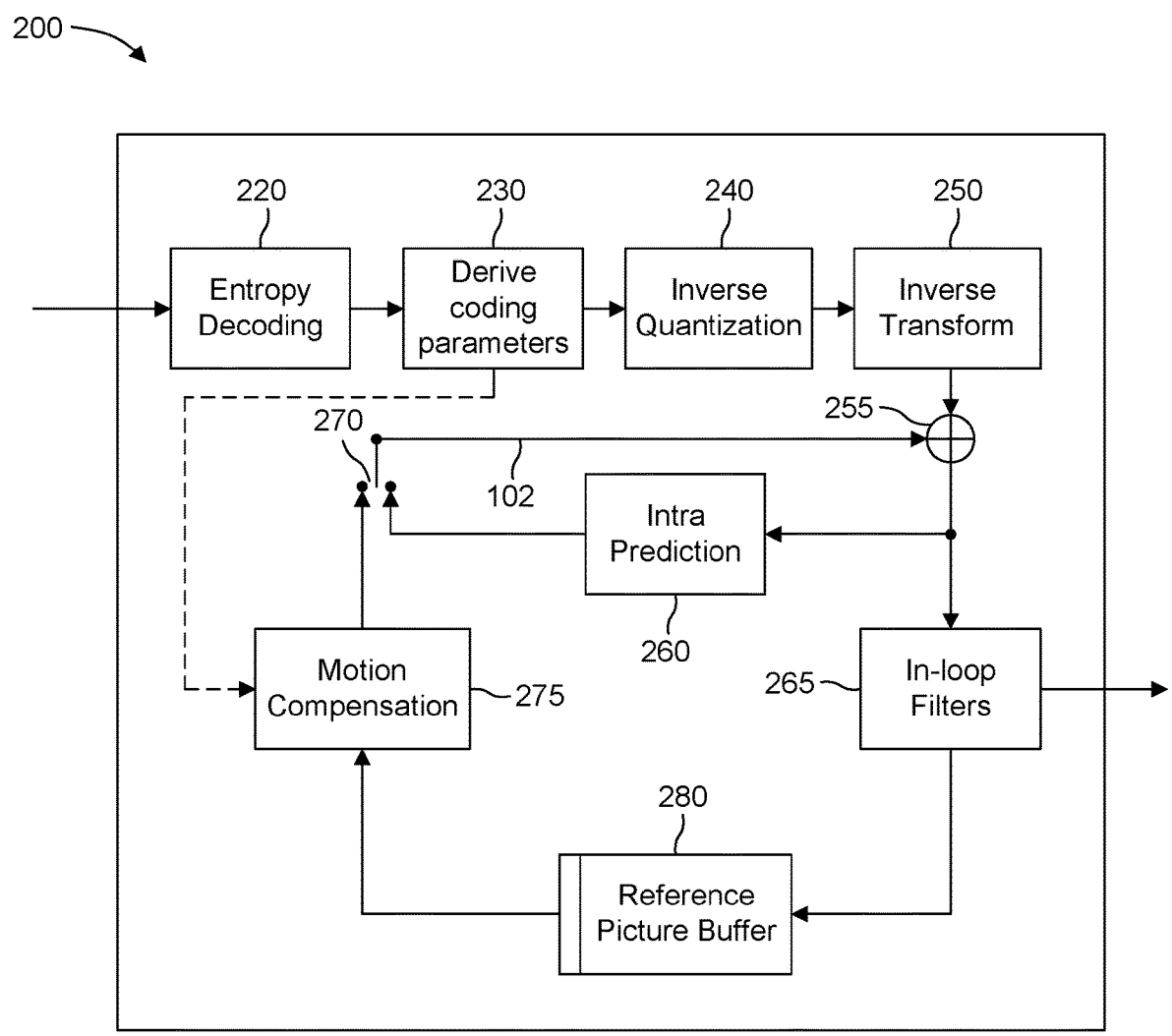
FIG. 13 illustrates a standard, generic, video decompression scheme (decoder).
Figure 19:
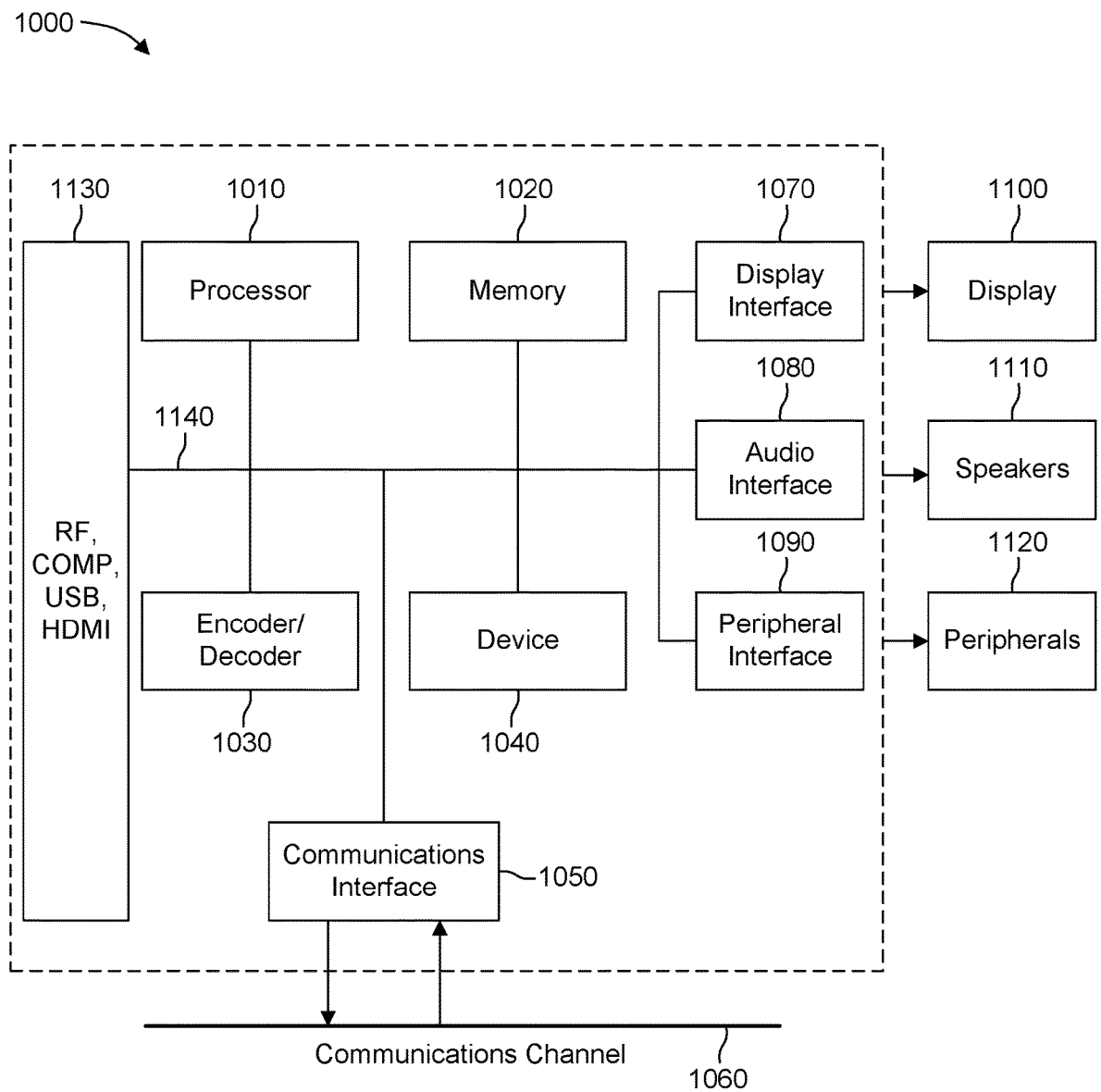
FIG. 19 illustrates a processor based system for encoding/decoding under the general described aspects.

The aspects described and contemplated in this document can be implemented in many different forms. FIGS. 12, 13 and 19 below provide some embodiments, but other embodiments are contemplated and the discussion of FIGS. 2, 3 and 9 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 12 and FIG. 13. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1)}}. The specific values are for example purposes and the aspects described are not limited to these specific values.

FIG. 12 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 13 illustrates a block diagram of a video decoder 200. In the decoder 200, a bitstream is decoded by the decoder elements as described below. Video decoder 200 generally performs a decoding pass reciprocal to the encoding pass as described FIG. 12. The encoder 100 also generally performs video decoding as part of encoding video data.

The input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 19 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the 12C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in combination, across various different claim categories and types:

Relaxing hard constraints in a video coding standard to improve coding modes

The above relaxing of hard constraints, implemented through syntax changes

The above relaxing of hard constraints, implemented through ad-hoc entropy contexts The above relaxing of hard constraints implemented through changes to entropy initial probability parameters.

An encoding/decoding scheme wherein a CABAC context is added indicative of whether or not a coding mode is activated.

A mode inference mode in which mode exclusion is removed and/or the inferred value aspects (new syntax element to explicitly encode the value) are controlled/activated with a condition of a coded parameter A switchable filter mode in which the coding of hpellfldx is conditioned to the high-level parameter "enabled_interpolation_filter_flag".

A mode in which mmvd_merge_idx is coded allowing to set any merge candidate in the list.

In a variant, the coding of "mmvd_merge_idx" is conditioned to the high-level parameter "enabled_mmvd_merge_idx_flag".

Computation of a biased rate-distortion cost for a mode N when a mode M is activated for an initial set of blocks using the mode N.

Addition of a new context depending on a skip flag.

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs in-loop filtering according to any of the embodiments described.

A TV, set-top box, cell phone, tablet, or other electronic device that performs in-loop filtering according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs in-loop filtering according to any of the embodiments described.

A TV, set-top box, cell phone, tablet, or other electronic device that receives (e.g. using an antenna) a signal over the air that includes an encoded image, and performs in-loop filtering according to any of the embodiments described.

Figure 20:
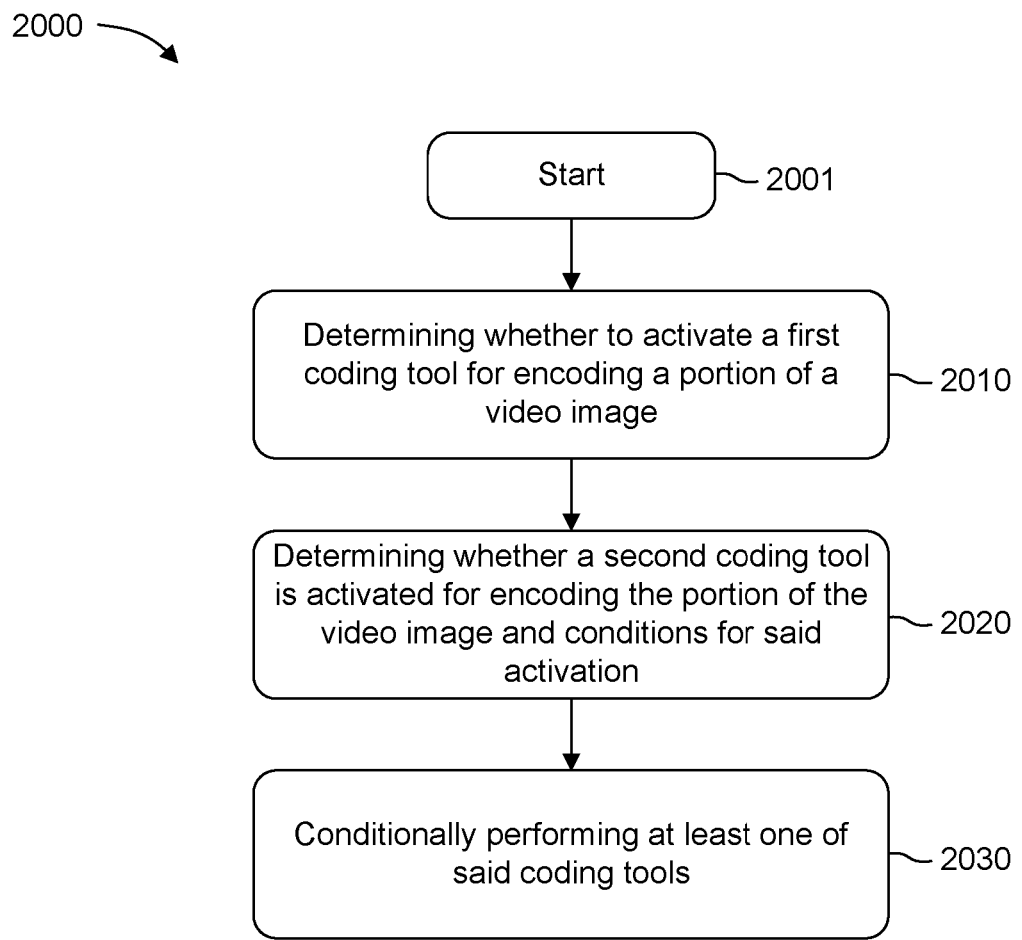
FIG. 20 illustrates a method for encoding using the described aspects.

One embodiment of a method 2000 under the general aspects described here is shown in FIG. 20. The method commences at start block 2001 and control proceeds to block 2010 for determining whether to activate a first coding tool for encoding a portion of a video image. Control proceeds from block 2010 to block 2020 for determining whether a second coding tool is activated for encoding the portion of the video image and conditions for said activation. Control proceeds from block 2020 to block 2030 for conditionally performing at least one of said coding tools.

Figure 21:
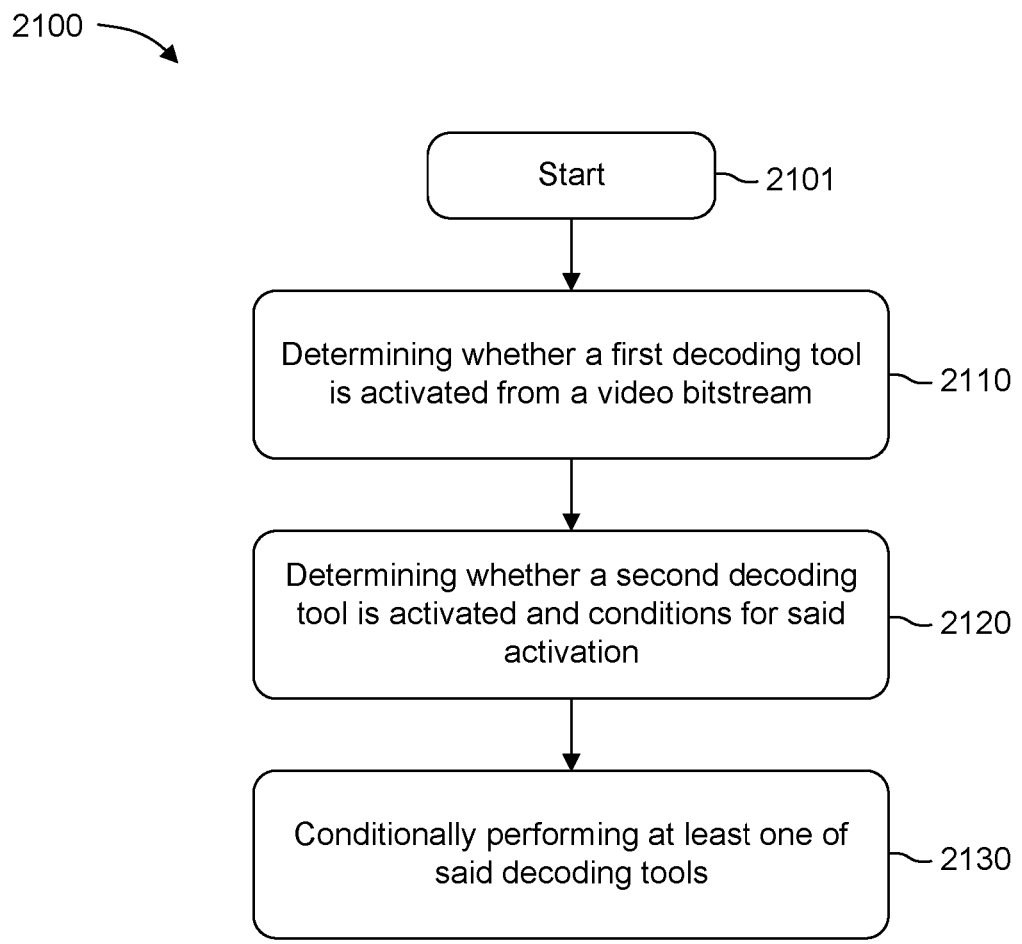
FIG. 21 illustrates a method for decoding using the described aspects.

One embodiment of a method 2100 under the general aspects described here is shown in FIG. 21. The method commences at start block 2101 and control proceeds to block 2110 for determining whether a first decoding tool is activated from a video bitstream. Control proceeds from block 2110 to block 2120 for determining whether a second decoding tool is activated and conditions for said activation. Control proceeds from block 2120 to block 2130 for conditionally performing at least one of said decoding tools.

Figure 22:
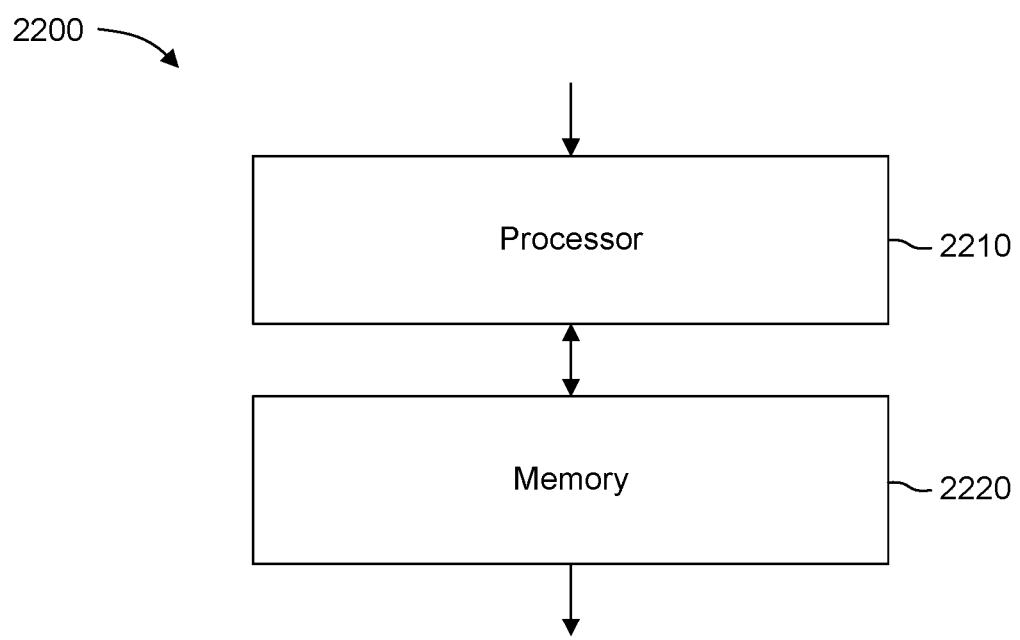
FIG. 22 illustrates an apparatus for encoding or decoding using the described aspects.

FIG. 22 shows one embodiment of an apparatus 2200 for encoding, decoding, compressing or decompressing video data using simplifications of coding modes based on neighboring samples dependent parametric models. The apparatus comprises Processor 2210 and can be interconnected to a memory 2220 through at least one port. Both Processor 2210 and memory 2220 can also have one or more additional interconnections to external connections.

Processor 2210 is also configured to either insert or receive information in a bitstream and, either compressing, encoding or decoding using any of the described aspects.

Various other generalized, as well as particularized, inventions and claims are also supported and contemplated throughout this description.

The invention claimed is:

1. A method, comprising:
   determining whether to activate a first coding tool for encoding a portion of a video image;
   determining whether a second coding tool is activated for encoding the portion of the video image;
   performing at least one of said coding tools responsive to the determinations;
   encoding a first syntax element indicating whether the first coding tool is activated; and
   encoding a second syntax element indicating whether the second coding tool is activated, said second syntax element being encoded using a first context bin in a case where the first syntax element indicates the first coding tool is activated and a second context bin otherwise, the second context bin being different from the first context bin.

2. A non-transitory computer readable medium containing data content generated according to the method of claim 1 for playback using a processor.

3. A non-transitory computer program product comprising stored instructions which, when the program is executed by a computer, cause the computer to carry out the method of claim 1.

4. The method of claim 1, wherein the first context bin used when the first coding tool is activated is initialized with a low probability.

5. The method of claim 1, wherein the first coding tool is matrix intra prediction with block size less than a value and the second coding tool is Low Frequency Non-Separable Transform.

6. The method of claim 1, wherein the first coding tool is skip mode and the second coding tool is Combined Intra-Inter Prediction.

7. The method of claim 1, wherein the first coding tool is multiple reference lines and the second coding tool is intra sub-block partitioning.

8. An apparatus, comprising:
a processor, configured to:
determine whether to activate a first coding tool for encoding a portion of a video image;
determine whether a second coding tool is activated for encoding the portion of the video image;
perform at least one of said coding tools responsive to the determinations;
encode a first syntax element indicating whether the first coding tool is activated; and
encode a second syntax element indicating whether the second coding tool is activated, said second syntax element being encoded using a first context bin in a case where the first syntax element indicates the first coding tool is activated and a second context bin otherwise, the second context bin being different from the first context bin.

9. The apparatus of claim 8, wherein the first context bin used when the first coding tool is activated is initialized with a low probability.

10. The apparatus of claim 8, wherein the first coding tool is matrix intra prediction with block size less than a value and the second coding tool is Low Frequency Non-Separable Transform.

11. The apparatus of claim 8, wherein the first coding tool is skip mode and the second coding tool is Combined Intra-Inter Prediction.

12. The apparatus of claim 8, wherein the first coding tool is multiple reference lines and the second coding tool is intra sub-block partitioning.

13. A method, comprising:
decoding a first syntax element indicating whether a first decoding tool is activated;
decoding a second syntax element indicating whether a second decoding tool is activated, said second syntax element being decoded using a first context bin in a case where the first syntax element indicates the first decoding tool is activated and a second context bin otherwise, the second context bin being different from the first context bin; and
performing at least one of said decoding tools based on the decoded first and second syntax elements.

14. A non-transitory computer program product comprising stored instructions which, when the program is executed by a computer, cause the computer to carry out the method of claim 13.

15. The method of claim 13, wherein the first context bin used when the first decoding tool is activated is initialized with a low probability.

16. The method of claim 13, wherein the first decoding tool is matrix intra prediction with block size less than a value and the second decoding tool is Low Frequency Non-Separable Transform.

17. The method of claim 13, wherein the first decoding tool is skip mode and the second decoding tool is Combined Intra-Inter Prediction.

18. The method of claim 13, wherein the first decoding tool is multiple reference lines and the second decoding tool is intra sub-block partitioning.

19. An apparatus, comprising:
a processor, configured to:
decode a first syntax element indicating whether a first decoding tool is activated;
decode a second syntax element indicating whether a second decoding tool is activated, said second syntax element being decoded using a first context bin in a case where the first syntax element indicates the first decoding tool is activated and a second context bin otherwise, the second context bin being different from the first context bin; and
perform at least one of said decoding tools based on the decoded first and second syntax elements.

20. A device comprising:
the apparatus according to claim 19; and
at least one of:
an antenna configured to receive a signal, the signal including a video block;
a band limiter configured to limit the received signal to a band of frequencies that includes the video block, or
a display configured to display an output representative of the video block.

21. The apparatus of claim 19, wherein the first context bin used when the first decoding tool is activated is initialized with a low probability.

22. The apparatus of claim 19, wherein the first decoding tool is matrix intra prediction with block size less than a value and the second decoding tool is Low Frequency Non-Separable Transform.

23. The apparatus of claim 19, wherein the first decoding tool is skip mode and the second decoding tool is Combined Intra-Inter Prediction.

24. The apparatus of claim 19, wherein the first decoding tool is multiple reference lines and the second decoding tool is intra sub-block partitioning.

* * * * *